(12) United States Patent
Park

(10) Patent No.: US 12,155,234 B2
(45) Date of Patent: *Nov. 26, 2024

(54) METHOD FOR DETECTING FOREIGN MATERIAL, AND APPARATUS AND SYSTEM THEREFOR

(71) Applicant: LG INNOTEK CO., LTD., Seoul (KR)

(72) Inventor: Jae Hee Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,449

(22) Filed: Jul. 18, 2023

(65) Prior Publication Data

US 2023/0361603 A1 Nov. 9, 2023

Related U.S. Application Data

(63) Continuation of application No. 18/181,208, filed on Mar. 9, 2023, now Pat. No. 11,923,699, which is a (Continued)

(30) Foreign Application Priority Data

Aug. 23, 2016 (KR) .................. 10-2016-0106789
Sep. 12, 2016 (KR) .................. 10-2016-0117518

(51) Int. Cl.
*H02J 50/60* (2016.01)
*H02J 7/02* (2016.01)
(Continued)

(52) U.S. Cl.
CPC ............... *H02J 50/60* (2016.02); *H02J 7/02* (2013.01); *H02J 50/10* (2016.02); *H02J 50/12* (2016.02);
(Continued)

(58) Field of Classification Search
CPC ...................................................... H02J 50/60
(Continued)

(56) References Cited

U.S. PATENT DOCUMENTS

2012/0001493 A1  1/2012 Kudo et al.
2013/0099592 A1  4/2013 Abe
(Continued)

FOREIGN PATENT DOCUMENTS

EP    2552030 A2    1/2013
EP    3480588 A1    5/2019
(Continued)

OTHER PUBLICATIONS

"System Description Wireless Power Transfer—vol. I: Low Power—Part 1: Interface Definition," Wireless Power Consortium, Jun. 2013, XP055206490, 183 pages total.
(Continued)

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

A wireless power transmitter that transmits power to a wireless power receiver, the wireless power transmitter including a wireless communication unit configured to communicate with the wireless power receiver; and a controller, wherein the wireless communication unit receives, from the wireless power receiver, a first foreign object status packet and a second foreign object status packet and transmits, to the wireless power receiver, a foreign object detection indicator indicating whether a foreign object is present in a charging area of the wireless power transmitter, wherein the controller is configured to generate the foreign object detection indicator, wherein the first foreign object status packet includes a first reference value and mode information,
(Continued)

wherein the second foreign object status packet includes a second reference value and mode information, wherein the mode information of the first foreign object status packet indicates whether the first reference value is a reference quality factor or a reference peak frequency of the wireless power receiver, and wherein the mode information of the second foreign object status packet indicates whether the second reference value is the reference quality factor or the reference peak frequency of the wireless power receiver.

10 Claims, 28 Drawing Sheets

Related U.S. Application Data continuation of application No. 17/183,012, filed on Feb. 23, 2021, now Pat. No. 11,652,371, which is a continuation of application No. 16/327,622, filed as application No. PCT/KR2017/009208 on Aug. 23, 2017, now Pat. No. 11,005,303.

(51) Int. Cl.
*H02J 50/10* (2016.01)
*H02J 50/12* (2016.01)
*H02J 50/20* (2016.01)
*H02J 50/40* (2016.01)
*H02J 50/80* (2016.01)
*H02J 50/90* (2016.01)

(52) U.S. Cl.
CPC ............ *H02J 50/20* (2016.02); *H02J 50/402* (2020.01); *H02J 50/80* (2016.02); *H02J 50/90* (2016.02)

(58) Field of Classification Search
USPC ......................................................... 320/108
See application file for complete search history.

(56) References Cited

U.S. PATENT DOCUMENTS

| | | | |
|---|---|---|---|
| 2013/0134792 A1 | 5/2013 | Bunsen et al. | |
| 2014/0084857 A1 | 3/2014 | Liu et al. | |
| 2014/0125287 A1* | 5/2014 | Nakano ............... | H02J 7/00034 307/104 |
| 2014/0159503 A1 | 6/2014 | Murakami et al. | |
| 2014/0266036 A1 | 9/2014 | Jung et al. | |
| 2015/0171633 A1 | 8/2015 | Nakano et al. | |
| 2015/0285926 A1 | 10/2015 | Oettinger | |
| 2016/0031332 A1 | 2/2016 | Garcia Briz et al. | |
| 2016/0134334 A1 | 5/2016 | Park et al. | |
| 2016/0141882 A1 | 5/2016 | Ichikawa | |
| 2016/0164302 A1 | 6/2016 | Nakano et al. | |
| 2016/0218559 A1 | 7/2016 | Mehas et al. | |
| 2016/0218566 A1 | 7/2016 | Bunsen et al. | |
| 2016/0241086 A1 | 8/2016 | Jung et al. | |
| 2018/0241257 A1 | 8/2018 | Muratov et al. | |

FOREIGN PATENT DOCUMENTS

| | | | |
|---|---|---|---|
| JP | 2009-201328 A | 9/2009 | |
| JP | 2010-35408 A | 2/2010 | |
| JP | 2013-27255 A | 2/2013 | |
| JP | 2015-46990 A | 3/2015 | |
| KR | 10-2014-0113147 A | 9/2014 | |
| KR | 10-2015-0003408 A | 1/2015 | |
| KR | 10-2015-0059069 A | 5/2015 | |
| KR | 10-2016-0011143 A | 1/2016 | |
| KR | 10-2016-0022823 A | 3/2016 | |
| WO | WO 2013/005860 A1 | 1/2013 | |
| WO | WO 2015/144389 A1 | 10/2015 | |
| WO | WO 2015/156628 A1 | 10/2015 | |
| WO | WO 2016/024869 A1 | 2/2016 | |

OTHER PUBLICATIONS

"The Qi Wireless Power Transfer System Power Class 0 Specification—Parts 1 and 2: Interface Definitions," Wireless Power Consortium, Apr. 2016, XP055915687, pp. 1-160.

\* cited by examiner

FIG. 10

| HEADER | PACKET TYPE | MESSAGE SIZE (BYTE) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

FIG. 17

| CLASSIFICATION | CASE WHERE ONLY RECEIVER IS PLACED | | CASE WHERE RECEIVER AND FOREIGN OBJECT ARE PLACED (FOREIGN OBJECT: FO#4) | | | | | |
|---|---|---|---|---|---|---|---|---|
| | | | POSITION OF FOREIGN OBJECT IN CHARGING AREA | | | | | |
| | | | CENTER OF CHARGING AREA | | MOVE FROM CENTER BY 10 mm | | MOVE FROM CENTER BY 20 mm | |
| | PEAK FREQUENCY | Q | PEAK FREQUENCY | Q | PEAK FREQUENCY | Q | PEAK FREQUENCY | Q |
| FIRST RECEIVER | 101.07 kHz | 67.1 | 109.16 kHz | 50.4 | 107.92 kHz | 53.2 | 104.17 kHz | 61.5 |
| SECOND RECEIVER | 97.36 kHz | 55.8 | 106.72 kHz | 43.1 | 105.51 kHz | 45.2 | 101.39 kHz | 52.6 |
| THIRD RECEIVER | 92.64 kHz | 64 | 105.05 kHz | 44.5 | 104.22 kHz | 49.7 | 99.06 kHz | 58.1 |
| FOURTH RECEIVER | 93.58 kHz | 54.56 | 104.76 kHz | 41.67 | 102.64 kHz | 45.33 | 98.96 kHz | 52.00 |
| FIFTH RECEIVER | 95.29 kHz | 58.56 | 107.47 kHz | 45.00 | 104.44 kHz | 50.33 | 99.10 kHz | 57.00 |

1710  1720  1730  1740  1750

METHOD FOR DETECTING FOREIGN MATERIAL, AND APPARATUS AND SYSTEM THEREFOR

CROSS-REFERENCE TO RELATED APPLICATIONS

This Application is a Continuation of U.S. patent application Ser. No. 18/181,208 filed on Mar. 9, 2023 (now U.S. Pat. No. 11,923,699 issued on Mar. 5, 2024), which is a Continuation of U.S. patent application Ser. No. 17/183,012 filed on Feb. 23, 2021 (now U.S. Pat. No. 11,652,371 issued on May 16, 2023), which is a Continuation of U.S. patent application Ser. No. 16/327,622 filed on Feb. 22, 2019 (now U.S. Pat. No. 11,005,303 issued on May 11, 2021), which is the National Phase of PCT International Application No. PCT/KR2017/009208 filed on Aug. 23, 2017, which claims the priority benefit under 35 U.S.C. § 119(a) to Korean Patent Application Nos. 10-2016-0117518 filed in the Republic of Korea on Sep. 12, 2016 and 10-2016-0106789 filed in the Republic of Korea on Aug. 23, 2016, all of which are hereby expressly incorporated by reference into the present application.

BACKGROUND

Technical Field

Embodiments relate to wireless power transmission technology and, more particularly, a method of detecting a foreign object placed in a charging area of a wireless power transmitter, and an apparatus and system therefor.

Discussion of the Related Art

Recently, as information and communication technology has been rapidly developed, a ubiquitous society based on information and communication technology is being developed.

In order to connect information communication devices anytime anywhere, sensors equipped with a computer chip having a communication function should be installed in all social facilities. Accordingly, supplying power to such devices or sensors is a new challenge. In addition, as the types of mobile devices such as music players such as Bluetooth handsets or iPods as well as mobile phones have rapidly increased, it is necessary for users to take more time and efforts to charge batteries. As a method of solving such problems, wireless power transfer technology has recently attracted attention.

Wireless power transmission or wireless energy transfer refers to technology for wirelessly transmitting electric energy from a transmitter to a receiver using the magnetic induction principle. In 1800s, electric motors or transformers using the electromagnetic induction principle have begun to be used and, thereafter, attempts have been made to radiate electromagnetic waves such as high frequencies, microwaves and lasers to transfer electric energy. Frequently used electric toothbrushes or some wireless shavers are charged using the electromagnetic induction principle.

Up to now, a wireless energy transfer method may be roughly divided into a magnetic induction method, an electromagnetic resonance method and a radio frequency (RF) transmission method of a short-wavelength radio frequency.

The magnetic induction method uses a phenomenon that, when two coils are located adjacent to each other and then current is applied to one coil, a magnetic flux is generated to cause an electromotive force in the other coil, and is rapidly being commercialized in small devices such as mobile phones. The magnetic induction method may transfer power of up to several hundreds of kilowatts (kW) and has high efficiency. However, since a maximum transmission distance is 1 centimeter (cm) or less, a device to be charged should be located adjacent to a charger or the floor.

The electromagnetic resonance method uses an electric field or a magnetic field instead of using electromagnetic waves or current. The electromagnetic resonance method is rarely influenced by electromagnetic waves and thus is advantageously safe for other electronic devices or human bodies. In contrast, this method may be used in a limited distance and space and energy transmission efficiency is somewhat low.

The short-wavelength wireless power transmission method (briefly, referred to as the RF transmission method) takes advantage of the fact that energy may be directly transmitted and received in the form of a radio wave. This technology is a RF wireless power transmission method using a rectenna. The rectenna is a combination of an antenna and a rectifier and means an element for directly converting RF power into DC power. That is, the RF method is technology of converting AC radio waves into DC. Recently, as efficiency of the RF method has been improved, studies into commercialization of the RF method have been actively conducted.

Wireless power transmission technology may be used not only in mobile related industries but also in various industries such as IT, railroad and home appliance.

If a conductor which is not a wireless power receiver, that is, a foreign object (FO), is present in a wireless charging area, an electromagnetic signal received from a wireless power transmitter may be induced in the FO, thereby increasing in temperature. For example, the FO may include coins, clips, pins, and ballpoint pens.

If an FO is present between a wireless power receiver and a wireless power transmitter, wireless charging efficiency may be significantly lowered, and the temperatures of the wireless power receiver and the wireless power transmitter may increase due to increase in ambient temperature of the FO. If the FO located in the charging area is not removed, power waste may occur and the wireless power transmitter and the wireless power receiver may be damaged due to overheating.

Accordingly, accurate detection of the FO located in the charging area is becoming an important issue in wireless charging technology.

Technical Problem

Embodiments provide a method of detecting a foreign object for wireless charging, and an apparatus and system therefor.

Embodiments provide a foreign object detection method capable of more accurately detecting a foreign object, by dynamically calibrating a measured quality factor value upon detecting the foreign object according to shift of a current peak frequency from a reference peak frequency, and an apparatus therefor.

Embodiments provide a foreign object detection method capable of more accurately detecting a foreign object, by calculating a quality factor slope based on output voltage levels measured at a current peak frequency and a start frequency within an operating frequency band and comparing the quality factor slope with a predetermined quality factor slope threshold value, and an apparatus and system therefor.

Embodiments provide a foreign object detection method capable of more accurately detecting a foreign object, by calculating a quality factor slope based on quality factor values measured at a current peak frequency and a start frequency within an operating frequency band and comparing the quality factor slope with a predetermined quality factor slope threshold value, and an apparatus and system therefor.

Embodiments provide a foreign object detection method capable of improving foreign object detection capability, by adaptively applying a foreign object detection method based on a quality factor and a foreign object detection method based on a peak frequency, and an apparatus and system therefor.

Embodiments provide a foreign object detection method capable of detecting a foreign object based on the shift direction of a peak frequency, and an apparatus and system therefor.

The technical problems solved by the embodiments are not limited to the above technical problems and other technical problems which are not described herein will become apparent to those skilled in the art from the following description.

Embodiments provide a method of detecting a foreign object, and an apparatus and system therefor.

In an embodiment, a method of detecting a foreign object in a wireless power transmitter includes measuring a quality factor value corresponding to a reference operating frequency when an object is detected, searching for a current peak frequency having a maximum quality factor value within an operating frequency band, receiving a foreign object detection status packet including information on a reference peak frequency from a wireless power receiver, calibrating the measured quality factor value using a difference between the current peak frequency and the reference peak frequency, and comparing the calibrated quality factor value with a predetermined quality factor threshold value to determine whether the foreign object is present.

The foreign object detection status packet may further include a reference quality factor value. The quality factor threshold value may be determined based on the reference quality factor value, and the reference quality factor value may be measured at the reference operating frequency in a state in which the wireless power receiver is powered off.

The reference peak frequency may have a maximum quality factor value within the operating frequency band in a state in which only the wireless power receiver is placed in a charging area.

In addition, the foreign object detection method may further include identifying whether the detected object is a receiver capable of performing wireless power transfer, and the quality factor value may be measured in a state in which power transfer is temporarily stopped before entering the identifying step, after detecting the object.

In addition, the foreign object detection method may further include stopping power transfer to the wireless power receiver upon determining that the foreign object is detected.

In addition, the foreign object detection method may further include outputting a predetermined warning alarm indicating that the foreign object has been detected after stopping power transfer.

In addition, the foreign object detection method may further include checking whether the detected foreign object has been removed from the charging area. Upon checking that the detected foreign object has been removed, power transfer to the wireless power receiver may start and the warning alarm may be released.

The foreign object detection status packet may further include mode information, and whether the information on the reference peak frequency is included in the foreign object detection status packet may be identified based on the mode information.

In addition, the foreign object detection method may further include receiving a first maximum quality factor value corresponding to the reference peak frequency from the wireless power receiver, and calculating a quality factor shift value by subtracting a second maximum quality factor value corresponding to the current peak frequency from the first maximum quality factor value. The measured quality factor value may be calibrated further using the quality factor shift value.

In addition, the first maximum quality factor value may be included and received in the foreign object detection status packet.

The determining of whether the foreign object is present may include determining that the foreign object is present, when the calibrated quality factor value is less than the predetermined quality factor threshold value and determining that the foreign object is not present, when the calibrated quality factor value is equal to or greater than the predetermined quality factor threshold value.

According to another embodiment, a method of detecting a foreign object in a wireless power transmitter includes searching for a current peak frequency having a maximum quality factor value within an operating frequency band when an object is detected, measuring output voltage levels at a start frequency and the current peak frequency of the operating frequency band, calculating a quality factor slope based on the calculated quality factor levels, and determining whether the foreign object is present based on the calculated quality factor slope.

The quality factor slope may be calculated by dividing a difference between the output voltage level corresponding to the current peak frequency and the output voltage level corresponding to the start frequency by a difference between the current peak frequency and the start frequency.

In addition, the determining of whether the foreign object is present may include determining whether the calculated quality factor slope is less than a predetermined quality factor slope threshold value, determining that the foreign object is present, when the calculated quality factor slope is less than the predetermined quality factor slope threshold value, and determining that the foreign object is not present, when the calculated quality factor slope is equal to or greater than the predetermined quality factor slope threshold value.

According to another embodiment, a method of detecting a foreign object in a wireless power transmitter includes searching for a current peak frequency having a maximum quality factor value within an operating frequency band when an object is detected, deciding a quality factor value at a start frequency and the current peak frequency of the operating frequency band, calculating a quality factor slope based on the decided quality factor value, and determining whether the foreign object is present based on the calculated quality factor slope.

The quality factor slope may be calculated by dividing a difference between the quality factor value corresponding to the current peak frequency and the quality factor value corresponding to the start frequency by a difference between the current peak frequency and the start frequency.

According to another embodiment, a wireless power transmitter includes a quality factor measurement unit configured to measure a quality factor value corresponding to a reference operating frequency when an object is detected, a peak frequency search unit configured to search for a current peak frequency having a maximum quality factor value within an operating frequency band, a communication unit configured to receive a foreign object detection status packet including information on a reference peak frequency from a wireless power receiver, a calibration unit configured to calibrate the measured quality factor value using a difference between the current peak frequency and the reference peak frequency, and a detection unit configured to compare the calibrated quality factor value with a predetermined quality factor threshold value to determine whether the foreign object is present.

The foreign object detection status packet may further include a reference quality factor value. The quality factor threshold value may be determined based on the reference quality factor value, and the reference quality factor value may be measured at the reference operating frequency in a state in which the wireless power receiver is powered off.

The reference peak frequency may have a maximum quality factor value within the operating frequency band in a state in which only the wireless power receiver is placed in a charging area.

In addition, the measurement may measure the quality factor value in a state in which power transfer is temporarily stopped before entering the procedure of identifying the wireless power receiver and search for the current peak frequency.

In addition, power transfer to the wireless power receiver may be stopped, upon determining that the foreign object is detected.

In addition, the foreign object detection apparatus may further include an alarm unit configured to output a predetermined warning alarm indicating that the foreign object has been detected after stopping power transfer.

In addition, the foreign object detection apparatus may further include a controller configured to check whether the detected foreign object has been removed from the charging area. Upon checking that the detected foreign object has been removed, the controller may perform control to start power transfer to the wireless power receiver and to release the warning alarm.

The foreign object detection status packet may further include mode information, and whether the information on the reference peak frequency is included in the foreign object detection status packet may be identified based on the mode information.

In addition, when a first maximum quality factor value corresponding to the reference peak frequency is received from the wireless power receiver through the communication unit, the calibration unit may calculate a quality factor shift value by subtracting a second maximum quality factor value corresponding to the current peak frequency from the first maximum quality factor value, and calibrate the measured quality factor value further using the quality factor shift value.

Here, the first maximum quality factor value may be included and received in the foreign object detection status packet.

The detection unit may determine that the foreign object is present when the calibrated quality factor value is less than the predetermined quality factor threshold value and determine that the foreign object is not present when the calibrated quality factor value is equal to or greater than the predetermined quality factor threshold value.

According to another embodiment, a foreign object detection apparatus for detecting a foreign object placed in a charging area includes a quality factor measurement unit configured to search for a current peak frequency having a maximum quality factor value within an operating frequency band when an object is detected, an output voltage measurement unit configured to measure output voltage levels at a start frequency and the current peak frequency of the operating frequency band, a quality factor slope determination unit configured to calculate a quality factor slope based on the calculated quality factor levels, and a foreign object detection unit configured to determine whether the foreign object is present based on the calculated quality factor slope.

According to another embodiment, a foreign object detection apparatus for detecting a foreign object placed in a charging area includes a peak frequency search unit configured to search for a current peak frequency having a maximum quality factor value within an operating frequency band when an object is detected, a quality factor measurement unit configured to measure a quality factor value at a start frequency and the current peak frequency of the operating frequency band, a quality factor slope determination unit configured to calculate a quality factor slope based on the measured quality factor value, and a foreign object detection unit configured to determine whether the foreign object is present based on the calculated quality factor slope.

In addition, according to an embodiment, it is possible to provide a foreign object detection method capable of improving foreign object detection capability, by adaptively applying a foreign object detection method based on a quality factor and a foreign object detection method based on a peak frequency, and an apparatus and system therefor.

In addition, according to an embodiment, it is possible to provide a foreign object detection method capable of detecting a foreign object based on the shift direction of a peak frequency from the reference peak frequency, and an apparatus and system therefor.

In another embodiment, a computer-readable recording medium having recorded thereon a program for executing any one of the above-described methods may be provided.

The aspects of the disclosure are only a part of the preferred embodiments of the disclosure, and various embodiments based on technical features of the disclosure may be devised and understood by the person with ordinary skill in the art based on the detailed description of the disclosure.

Advantageous Effects

The effects of the method, apparatus and system according to embodiments are as follows.

Embodiments provide a method of detecting a foreign object for wireless charging, and an apparatus and system therefor.

Embodiments provide a method of detecting a foreign object, which is capable of more accurately detecting a foreign object, and an apparatus and system therefor.

Embodiments may minimize unnecessary power waste and a heating phenomenon due to a foreign object.

Embodiments provide a foreign object detection method capable of more accurately detecting a foreign object, by dynamically calibrating a measured quality factor value upon detecting the foreign object according to a degree of shift of a current peak frequency from a reference peak frequency, and an apparatus therefor.

Embodiments provide a foreign object detection method capable of more accurately detecting a foreign object, by calculating a quality factor slope based on output voltage levels measured at a current peak frequency and a start frequency in an operating frequency band and comparing the quality factor slope with a predetermined quality factor slope threshold value, and an apparatus and system therefor.

Embodiments provide a foreign object detection method capable of more accurately detecting a foreign object, by calculating a quality factor slope based on quality factor values measured at a current peak frequency and a start frequency in an operating frequency band and comparing the quality factor slope with a predetermined quality factor slope threshold value, and an apparatus and system therefor.

Embodiments provide a foreign object detection method capable of improving foreign object detection capability, by adaptively applying a foreign object detection method based on a quality factor and a foreign object detection method based on a peak frequency, and an apparatus and system therefor.

Embodiments provide a foreign object detection method capable of detecting a foreign object based on the shift direction of a peak frequency, and an apparatus and system therefor.

The effects of the disclosure are not limited to the above-described effects and other effects which are not described herein may be derived by those skilled in the art from the following description of the embodiments of the disclosure. That is, effects which are not intended by the disclosure may be derived by those skilled in the art from the embodiments of the disclosure.

BRIEF DESCRIPTION OF THE DRAWINGS

FIG. 10 is a diagram illustrating types of packets according to an embodiment;

FIG. 17 is an experimental result table illustrating a reference peak frequency of each receiver type and change in peak frequency according to placement of a foreign object;

DETAILED DESCRIPTION OF THE EMBODIMENTS

Figure 1:
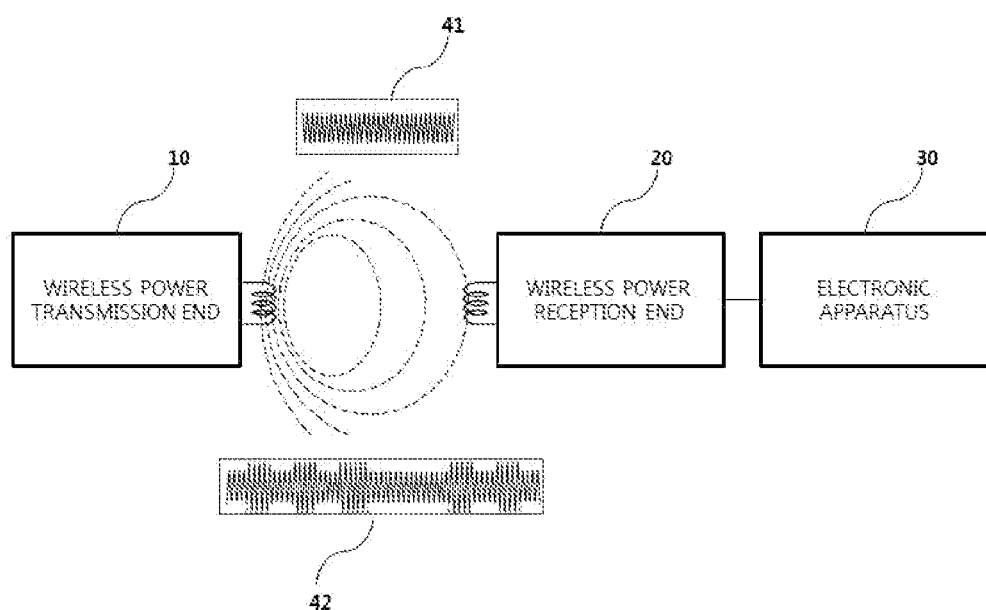
FIG. 1 is a block diagram illustrating a wireless charging system according to an embodiment.

A method of detecting a foreign object in a wireless power transmitter according to an embodiment includes measuring a quality factor value corresponding to a reference operating frequency when an object is detected, searching for a current peak frequency having a maximum quality factor value within an operating frequency band, receiving a foreign object detection status packet including information on a reference peak frequency from a wireless power receiver, calibrating the measured quality factor value using a difference between the current peak frequency and the reference peak frequency, and comparing the calibrated quality factor value with a predetermined quality factor threshold value to determine whether the foreign object is present.

Hereinafter, apparatuses and various methods according to embodiments will be described in detail with reference to the accompanying drawings. In general, a suffix such as "module" or "unit" may be used to refer to elements or components. Use of such a suffix herein is merely intended to facilitate description of the specification, and the suffix itself is not intended to have any special meaning or function.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the description of embodiments, an apparatus having a function for transmitting wireless power in a wireless charging system may be used interchangeably with a wireless power transmitter, a wireless power transfer apparatus, a wireless electric power transfer apparatus, a wireless electric power transmitter, a transmission end, a transmitter, a transmission apparatus, a transmission side, a wireless power transfer apparatus, a wireless power transferer, etc., for convenience of description. An apparatus having a function for receiving wireless power from a wireless power transfer apparatus may be used interchangeably with a wireless electric power reception apparatus, a wireless electric power receiver, a wireless power reception apparatus, a wireless power receiver, a reception terminal, a reception side, a reception apparatus, a receiver, etc.

The transmitter according to embodiment may be configured in the form of a pad, a cradle, an access point (AP), a small base station, a stand, a ceiling embedded structure or a wall-mounted structure. One transmitter may transfer power to a plurality of wireless power reception apparatuses. To this end, the transmitter may include at least one wireless power transfer means. Here, the wireless power transfer means may use various wireless power transfer standards based on an electromagnetic induction method of performing charging using the electromagnetic induction principle in which a magnetic field is generated in a power transfer-end coil and electricity is induced in a reception-end coil by the magnetic field. Here, the wireless power transfer means may include wireless charging technology of the electromagnetic induction method defined in the Wireless Power Consortium (WPC) and Power Matters Alliance (PMA) which are the wireless charging technology organizations.

In addition, a receiver according to an embodiment may include at least one wireless power reception means and may simultaneously receive wireless power from two or more transmitters. Here, the wireless power reception means may include wireless charging technology of the electromagnetic induction method defined in the Wireless Power Consortium (WPC) and Power Matters Alliance (PMA) which are the wireless charging technology organizations.

The receiver according to the embodiment may be used in a small electronic apparatus such as a mobile phone, a smartphone, a laptop, a digital broadcast terminal, a personal digital assistant (PDA), a portable multimedia player (PMP), a navigation system, an MP3 player, an electric toothbrush, an electronic tag, a lighting device, a remote controller, a fishing float, a wearable device such as a smart watch, etc. without being limited thereto, and may be used in any apparatus including wireless power reception means according to embodiment to charge a battery.

FIG. 1 is a block diagram illustrating a wireless charging system according to an embodiment.

Referring to FIG. 1, the wireless charging system roughly includes a wireless power transfer end 10 for wirelessly transmitting power, a wireless power reception end 20 for receiving the transmitted power and an electronic apparatus 30 for receiving the received power.

For example, the wireless power transfer end 10 and the wireless power reception end 20 may perform in-band communication in which information is exchanged using the same frequency band as the operating frequency used for wireless power transfer.

In in-band communication, when a power signal 41 transmitted by the wireless power transfer end 10 is received by the wireless power reception end 20, the wireless power reception end 20 may modulate the received power signal and transmit a modulated signal 42 to the wireless power transfer end 10.

In another example, the wireless power transfer end 10 and the wireless power reception end 20 may perform out-of-band communication in which information is exchanged using the frequency band different from the operating frequency used for wireless power transfer.

For example, the information exchanged between the wireless power transfer end 10 and the wireless power reception end 20 may include status information of each other and control information. Here, the status information and the control information exchanged between the transmission end and the reception end will become more apparent through the following description of the embodiments.

In-band communication and out-of-communication may provide bidirectional communication, but the embodiments are not limited thereto. In another embodiment, in-band communication and out-of-communication may provide a unidirectional communication or half duplex communication.

For example, unidirectional communication may, but is not limited to, mean transmission of information from the wireless power reception end 20 to the wireless power transfer end 10 or transmission from the wireless power transfer end 10 to the wireless power reception end 20.

The half duplex communication method is characterized in that bidirectional communication between the wireless power reception end 20 and the wireless power transfer end 10 is enabled but information can be transmitted only by one device at a certain point in time.

The wireless power reception end 20 according to the embodiment may acquire a variety of status information of the electronic apparatus 30. For example, the status information of the electronic apparatus 30 may include, but is not limited to, current power usage information, current power usage information, information for identifying an executed application, CPU usage information, battery charge status information, battery output voltage/current information, etc. and may include information capable of being acquired from the electronic apparatus 30 and being used for wireless power control.

In particular, the wireless power transfer end 10 according to the embodiment may transmit a predetermined packet indicating whether fast charging is supported to the wireless power reception end 20. The wireless power reception end 20 may inform the electronic apparatus 30 that the wireless power transfer end 10 supports the fast charging mode, upon determining that the wireless power transfer end 10 supports the fast charging mode. The electronic apparatus 30 may display information indicating that fast charging is possible through a predetermined display means, for example, a liquid crystal display.

In addition, the user of the electronic apparatus 30 may select a predetermined fast charging request button displayed on the liquid crystal display means and control the wireless power transmission end 10 to operate in the fast charging mode. In this case, when the user selects the fast charging request button, the electronic apparatus 30 may transmit a predetermined fast charging request signal to the wireless power reception end 20. The wireless power reception end 20 may generate and transmit a charging mode packet corresponding to the received fast charging request signal to the wireless power transmission end 10, thereby switching a normal low-power charging mode to the fast charging mode.

Figure 2:
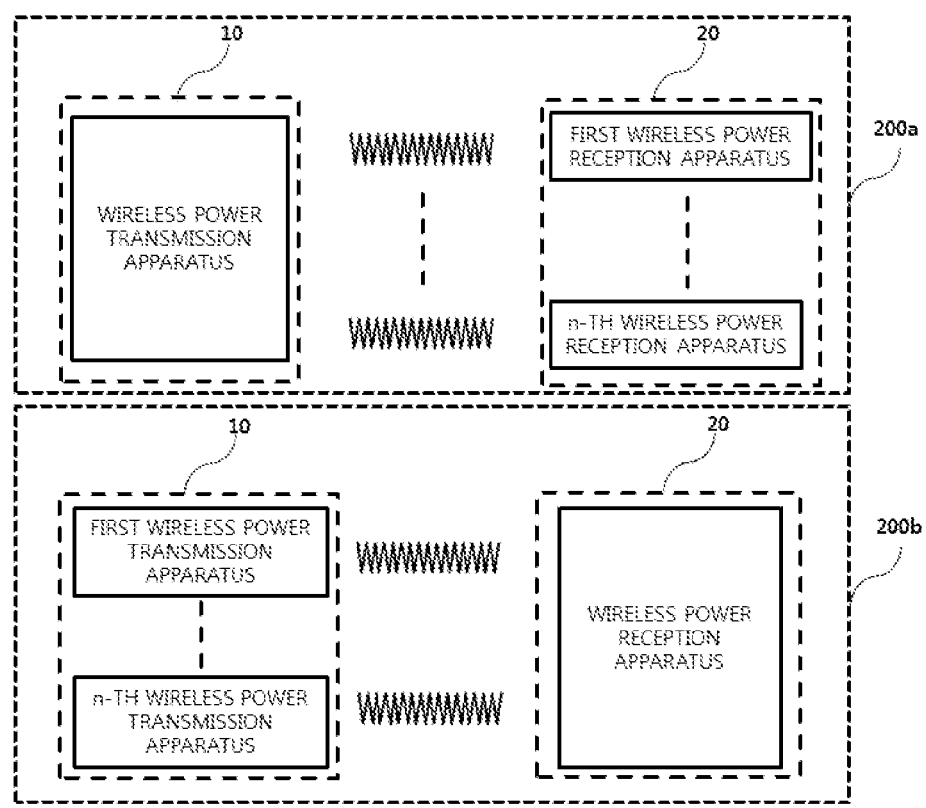
FIG. 2 is a block diagram illustrating a wireless charging system according to another embodiment.

FIG. 2 is a block diagram illustrating a wireless charging system according to another embodiment.

For example, as denoted by reference numeral 200a, the wireless power reception end 20 may include a plurality of wireless power reception apparatuses and one wireless power transmission end 10 may be connected with a plurality of wireless power reception apparatuses to perform wireless charging. At this time, the wireless power transmission end 10 divides and transmits power to the plurality of wireless power reception apparatuses in a time-divisional manner, without being limited thereto. In another example, the wireless power transmission end 10 may divide and transmit power to the plurality of wireless power reception apparatuses using different frequency bands allocated to the wireless power reception apparatuses.

At this time, the number of wireless power reception apparatuses connectable to one wireless power transmission apparatus 10 may be adaptively determined based on at least one of the required power amount of each wireless power reception apparatus, a battery charging status, the power consumption of an electronic apparatus and the available power amount of the wireless power transmission apparatus.

In another example, as denoted by reference numeral 200b, the wireless power transmission end 10 may include a plurality of wireless power transmission apparatuses. In this case, the wireless power reception end 20 may be simultaneously connected to the plurality of wireless power transmission apparatuses to simultaneously receive power from the connected wireless power transmission apparatuses, thereby performing charging. At this time, the number of wireless power transmission apparatuses connected to the wireless power reception end 20 may be adaptively determined based on the required power amount of the wireless power reception end 20, the battery charging state, the power consumption of the electronic apparatus and the available power amount of the wireless power transmission apparatus.

In addition, the plurality of wireless power transmission apparatuses may transmit power to the plurality of wireless power reception apparatuses. At this time, one wireless power transmission apparatus transmits power to one wireless power reception apparatus.

Figure 3:
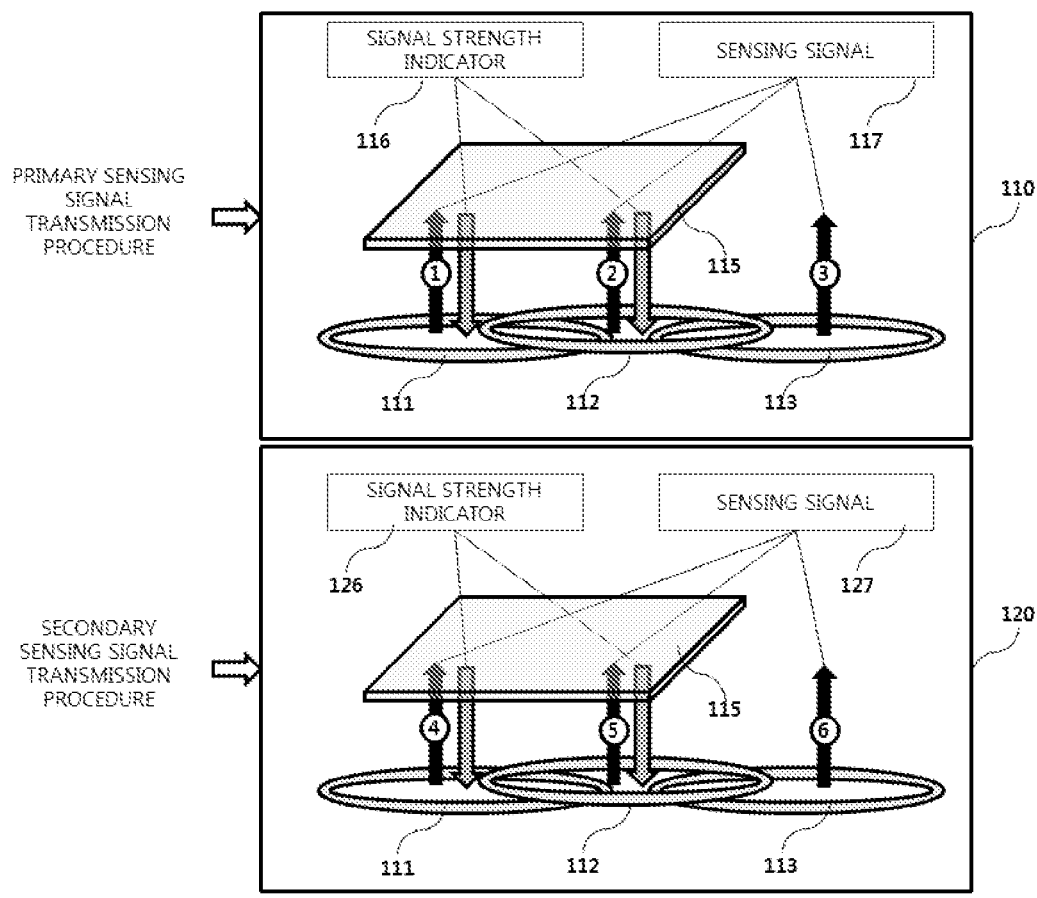
FIG. 3 is a view illustrating a sensing signal transmission procedure in a wireless charging system according to an embodiment.

FIG. 3 is a view illustrating a sensing signal transmission procedure in a wireless charging system according to an embodiment.

For example, a wireless power transmitter may include three transmission coils 111, 112 and 113 mounted therein. The transmission coils may partially overlap each other, and the wireless power transmitter sequentially transmits predetermined sensing signals 117 and 127 for detecting presence of a wireless power receiver, for example, digital ping signals, through each transmission coil in a predefined order.

As shown in FIG. 3, the wireless power transmitter may sequentially transmit the sensing signal 117 through a primary sensing signal transmission procedure denoted by reference numeral 110 and identify the transmission coils 111 and 112, through which a signal strength indicator 116 is received from the wireless power receiver 115. Subsequently, the wireless power transmitter may perform control to sequentially transmit the sensing signal 127 through a secondary sensing signal transmission procedure denoted by reference numeral 120, to identify a transmission coil having good power transfer efficiency (or charging efficiency), that is, a good alignment state between the transmission coil and the reception coil, between the transmission coils 111 and 112, through which the signal strength indicator 126 is received, and to transmit power through the identified transmission coil, that is, to perform wireless charging.

As shown in FIG. 3, the wireless power transmitter performs two sensing signal transmission procedures in order to more accurately identify to which transmission coil the reception coil of the wireless power receiver is well aligned.

If the signal strength indicators 116 and 126 are received through the first transmission coil 111 and the second transmission coil 112 as denoted by reference numerals 110 and 120 of FIG. 3, the wireless power transmitter selects the best aligned transmission coil based on the signal strength indicator 126 received through the first transmission coil 111 and the second transmission coil 112, and performs wireless charging using the selected transmission coil.

Figure 4:
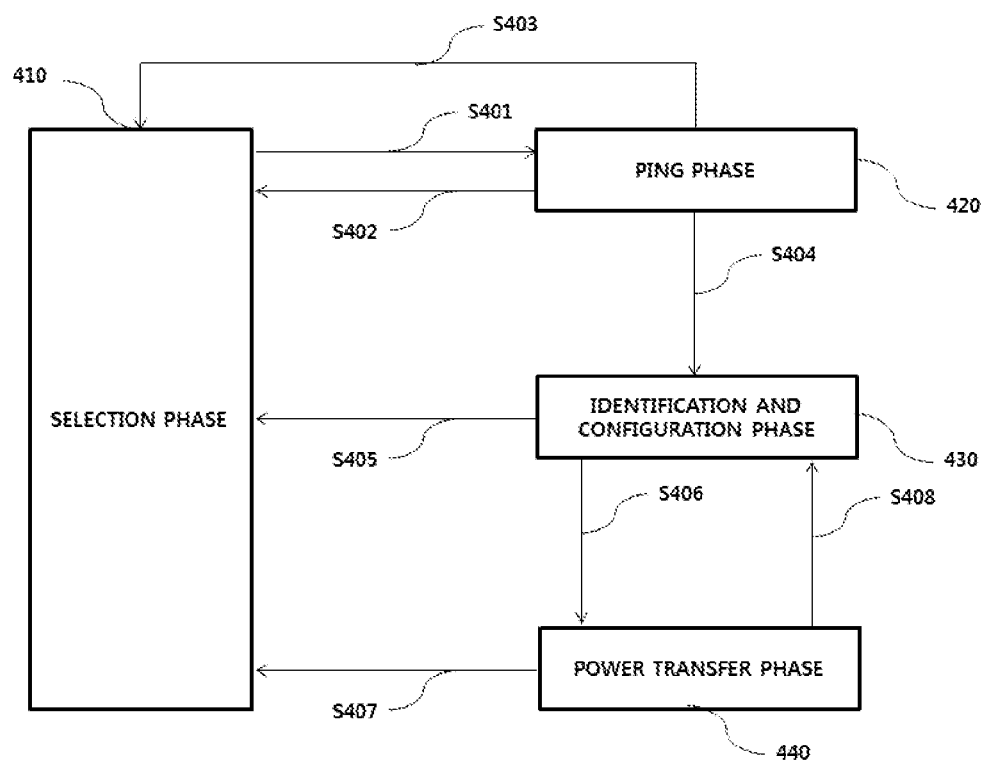
FIG. 4 is a state transition diagram explaining a wireless power transmission procedure according to another embodiment.

FIG. 4 is a state transition diagram explaining a wireless power transfer procedure defined in the WPC standard.

Referring to FIG. 4, power transfer from the transmitter to the receiver may be broadly divided into a selection phase 410, a ping phase 420, an identification and configuration phase 430, and a power transfer phase 440.

The selection phase 410 may transition when power transfer starts or when a specific error or a specific event is sensed while power transfer is maintained. The specific error and the specific event will become apparent from the following description.

In addition, in the selection phase 410, the transmitter may monitor whether an object is present on a charging interface surface. Upon detecting that the object is placed on the charging interface surface, the transmitter may transition to the ping phase 420 (S401).

In the selection phase 410, the transmitter may transmit an analog ping signal having a very short pulse and may detect whether an object is present in an active area, that is, a chargeable area, of the charging interface surface based on change in current of the transmission coil.

When the object is detected in the ping phase 420, the transmitter activates, that is, boots, the receiver and transmits a digital ping for identifying whether the object is a receiver. When a response signal, for example, a signal strength indicator, is not received from the receiver in response to the digital ping in the ping phase 410, the transmitter may transition to the selection phase 410 again (S402). In addition, when a signal indicating that power transfer has ended, that is, a charging end signal, is received from the receiver in the ping phase 420, the transmitter may transition to the selection phase 410 (S403).

When the ping phase 420 has ended, the transmitter may identify the receiver and transition to the identification and configuration phase 430 for identifying the receiver and collecting the configuration and status information of the receiver (S404).

In the identification and configuration phase 430, when an unexpected packet is received, when an expected packet is not received during a predetermined time (timeout), when a packet transmission error occurs, or when power transfer contract is not established (no power transfer contract), the transmitter may transition to the selection phase 410 (S405).

If identification and configuration of the receiver has ended, the transmitter may transition to the power transfer phase 440 for transferring wireless power (S406).

In the power transfer phase 440, when an unexpected packet is received, when an expected packet is not received during a predetermined time (timeout), when power transfer contract violation occurs or when charging is terminated, or when charging has ended, the transmitter may transition to the selection phase 410 (S407).

In addition, in the power transfer phase 440, if a power transfer contract needs to be reconfigured according to transmitter status change, etc., the transmitter may transition to the identification and configuration phase 430 (S408).

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 5A:
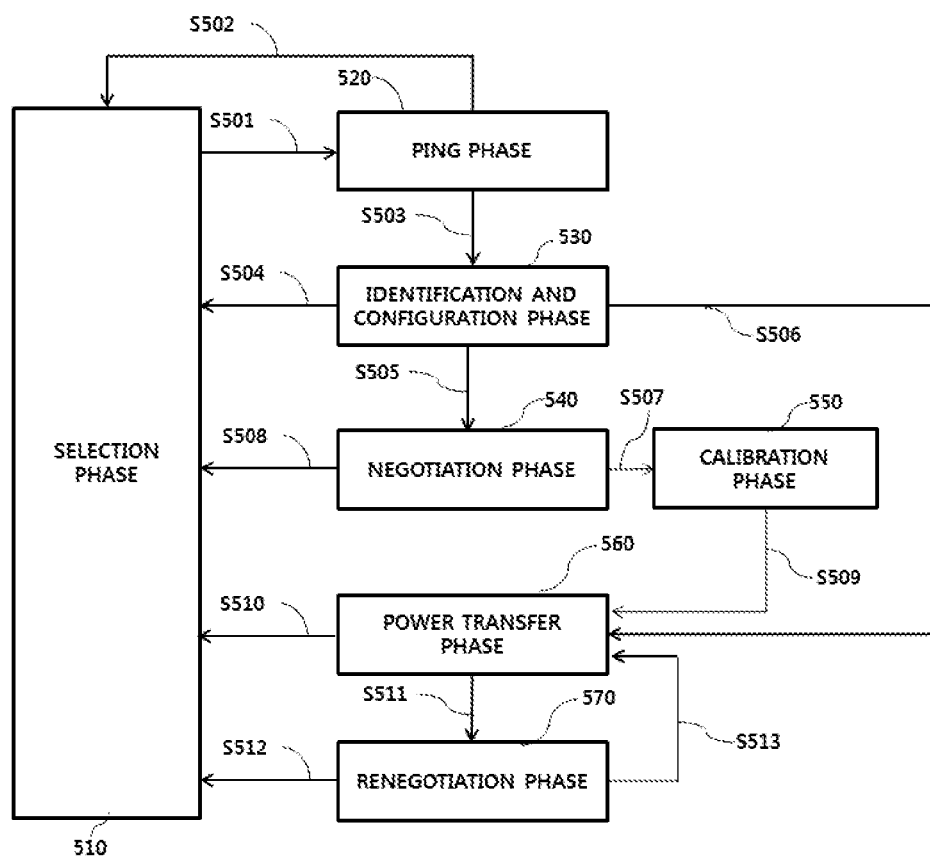
FIGS. 5A and 5B are state transition diagrams explaining a wireless power transmission procedure according to another embodiment.
Figure 5B:
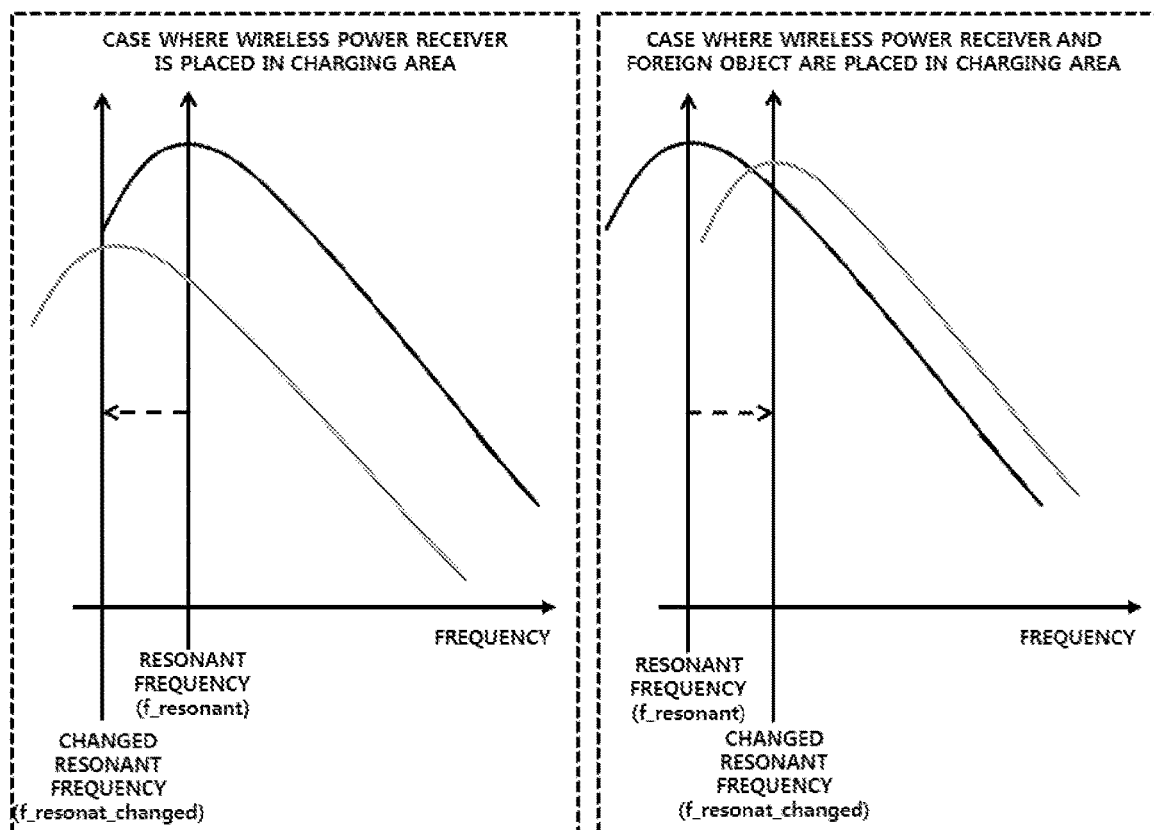

FIGS. 5A and 5B are state transition diagrams explaining a wireless power transfer procedure.

Referring to FIG. 5A, power transfer from the transmitter to the receiver according to the embodiment may be broadly divided into a selection phase 510, a ping phase 520, an identification and configuration phase 530, a negotiation phase 540, a calibration phase 550, a power transfer phase 560 and a renegotiation phase 570.

The selection phase 510 may transition when power transfer starts or when a specific error or a specific event is sensed while power transfer is maintained (for example, including reference numerals S502, S504, S508, S510 and S512). The specific error and the specific event will become apparent from the following description. In addition, in the selection phase 510, the transmitter may monitor whether an object is present on an interface surface. Upon detecting that the object is present on the interface surface, the transmitter may transition to the ping step 520. In the selection phase 510, the transmitter may transmit an analog ping signal having a very short pulse and detect whether an object is present in an active area of the interface surface based on change in current of a transmission coil or a primary coil.

If the object is detected in the selection phase 510, the wireless power transmitter may measure the quality factor of a wireless power resonant circuit (e.g., a power transfer coil and/or a resonant capacitor).

In one embodiment, when the object is detected in the selection phase 510, the quality factor may be measured in order to determine whether the wireless power receiver is placed in the charging area along with a foreign object. The coil provided in the wireless power transmitter has an inductance and/or a series resistance component in the coil which may decrease due to environmental change, thereby decreasing the quality factor value. In order to determine whether the foreign object is present using the measured quality factor value, the wireless power transmitter may receive, from the wireless power receiver, a reference quality factor value previously measured in a state in which a foreign object is not placed in the charging area. The reference quality factor value received in the negotiation phase 540 may be compared with the measured quality factor value, thereby determining whether the foreign object is present. However, in the case of a wireless power receiver having a low reference quality factor (for example, a specific wireless receiver may have a low reference quality factor value according to the type, usage and characteristics of the wireless power receiver), since a difference between the quality factor value measured when the foreign object is present and the reference quality factor is small, it is difficult to determine whether a foreign object is present. Accordingly, it is necessary to further consider other determination elements or to determine whether a foreign object is present using other methods.

In another embodiment, when the object is detected in the selection phase 510, the quality factor value within a specific frequency region (e.g., an operating frequency region) may be measured in order to determine whether the wireless power receiver is placed in the charging area along with the foreign object. The coil of the wireless power transmitter may have the inductance and/or series resistance component in the coil which may decrease due to environmental change, thereby changing (shifting) the resonant frequency of the coil of the wireless power transmitter. That is, a quality factor peak frequency as a frequency at which the maximum quality factor value is measured in the operating frequency band may be shifted.

For example, since the wireless power receiver includes a magnetic shield (shielding material) having high permeability, the high permeability may increase the inductance value measured in the coil of the wireless power transmitter. In contrast, a foreign object, which is a metallic material, decreases the inductance value.

For example, in the case where the resonant frequency of the coil of the wireless power transmitter is 100 kHz, a graph showing change in quality factor value measured when the wireless power receiver or the foreign object is placed in the charging area is shown in FIG. 5B.

Referring to FIG. 5B, generally, in the case of an LC resonant circuit, the resonant frequency f_resonant is calculated by $1/2\pi\sqrt{L*C}$.

Referring to the left graph of FIG. 5B, when only the wireless power receiver is placed in the charging area, since the L value increases, the resonant frequency decreases to be moved (shifted) to the left on the frequency axis.

Referring to the right graph of FIG. 5B, when a foreign object is placed in the charging area, since the L value decreases, the resonant frequency increases to be moved (shifted) to the right on the frequency axis.

In order to determine whether a foreign object is present using a frequency at which a maximum quality factor is measured, that is, a measured peak frequency, the wireless power transmitter may receive the reference maximum quality factor frequency pre-measured in a state in which the foreign object is not placed in the charging area, that is, the reference peak frequency, from the wireless power receiver. The received reference peak frequency value may be compared with the measured peak frequency value in the negotiation phase 540, thereby determining whether a foreign object is present.

The foreign object detection through peak frequency comparison may be used along with a method of comparing quality factor values. If a difference between the reference quality factor value and the measured quality factor value is small, for example, if the difference is equal to or less than 10%, presence of the foreign object may be determined by comparing the reference peak frequency with the measured peak frequency. In contrast, if the difference between the quality factors exceeds 10%, the wireless power transmitter may immediately determine that the foreign object is present.

In another example, upon determining that the foreign object is not present as the result of comparing the reference quality factor value with the measured quality factor value, the reference peak frequency may be compared with the measured peak frequency to determine whether a foreign object is present. If it is difficult to detect the foreign object using the quality factor, the wireless power receiver may include information on the reference peak frequency in a foreign object detection status packet and transmit the packet to the wireless power transmitter, and the wireless power transmitter may detect the foreign object further using information on the reference peak frequency, thereby improving foreign object detection capability.

The comparison method of the reference quality factor will be described in detail in the following embodiment.

In the ping step 520, when the object is sensed, the transmitter wakes up the receiver and transmits a digital ping for identifying whether the detected object is a wireless power receiver. In the ping step 520, when a response signal to the digital ping, for example, a signal strength packet, is not received from the receiver, the transmitter may transition to the selection phase 510 again. In addition, in the ping phase 520, when a signal indicating that power transfer has been terminated, that is, a charging termination packet, is received from the receiver, the transmitter may transition to the selection phase 510.

If the ping phase 520 is terminated, the transmitter may transition to the identification and configuration phase 530 for identifying the receiver and collecting the configuration and status information of the receiver.

In the identification and configuration phase 530, when an unexpected packet is received, when an expected packet is not received during a predetermined time (timeout), when a packet transmission error occurs, or when power transfer contract is not established (no power transfer contract), the transmitter may transition to the selection phase 510.

The transmitter may determine whether entry into the negotiation phase 540 is necessary based on the negotiation field value of the configuration packet received in the identification and configuration phase 530.

Upon determining that negotiation is necessary, the transmitter may transition to the negotiation phase 540 to perform a predetermined FOD procedure.

In contrast, upon determining that negotiation is not necessary, the transmitter may immediately transition to the power transfer phase 560.

In the negotiation phase 540, the transmitter may receive a foreign object detection (FOD) status packet including a reference quality factor value. Alternatively, an FOD status packet including a reference peak frequency value may be received. Alternatively, a status packet including a reference quality factor value and a reference peak frequency value may be received. At this time, the transmitter may determine a quality factor threshold value for FO detection based on the reference quality factor value. The transmitter may determine a peak frequency threshold value for FO detection based on the reference peak frequency value.

The transmitter may detect whether an FO is present in the charging area using the quality factor threshold value for FO detection and a currently measured quality factor value (a quality factor value measured before the ping phase) and control power transfer according to the result of FO detection. For example, when the FO is detected, power transfer may be stopped, without being limited thereto.

The transmitter may detect whether an FO is present in the charging area using the peak frequency threshold value for FO detection and a currently measured quality factor value (a quality factor value measured before the ping phase) and control power transfer according to the result of FO detection. For example, when the FO is detected, power transfer may be stopped, without being limited thereto.

When the FO is detected, the transmitter may return to the selection phase 510. In contrast, when the FO is not detected, the transmitter may transition to the power transfer phase 560 through the calibration phase 550. Specifically, when the FO is not detected, the transmitter may measure power loss at the reception end and the transmission end, in order to determine the strength of the power received by the reception end and to determine the strength of the power transmitted by the transmission end in the calibration phase 550. That is, the transmitter may predict power loss based on a difference between the transmission power of the transmission end and the reception power of the reception end in the calibration phase 550. The transmitter according to one embodiment may calibrate the threshold value for FO detection using the predicted power loss.

In the power transfer phase 560, when an unexpected packet is received, when an expected packet is not received during a predetermined time (timeout), when power transfer contract violation occurs or when charging is terminated, the transmitter may transition to the selection phase 510.

In addition, in the power transfer phase 560, if a power transfer contract needs to be reconfigured according to transmitter status change, etc., the transmitter may transition to the renegotiation phase 570. At this time, when renegotiation is normally terminated, the transmitter may return to the power transfer phase 560.

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 6:
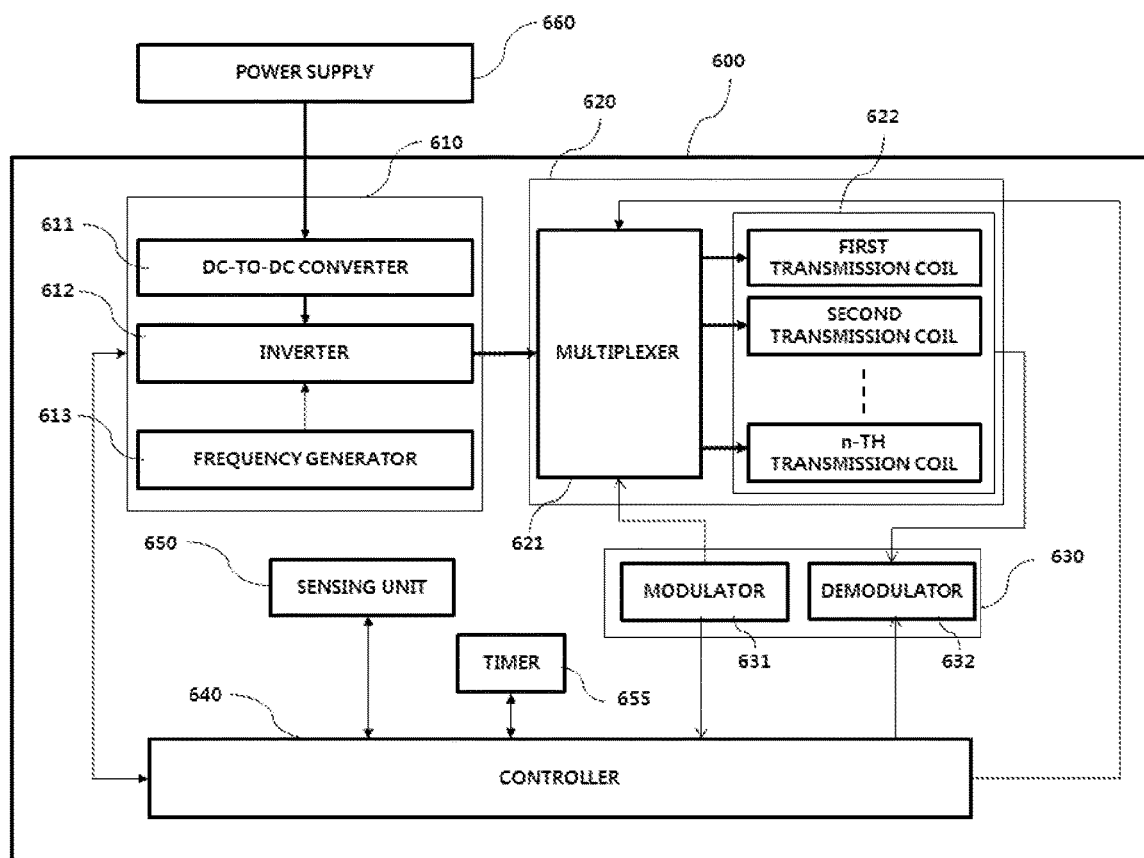
FIG. 6 is a block diagram illustrating the structure of a wireless power transmitter according to an embodiment.

FIG. 6 is a block diagram illustrating the structure of a wireless power transmitter according to an embodiment.

Referring to FIG. 6, the wireless power transmitter 600 may roughly include a power converter 610, a power transmission unit 620, a communication unit 630, a controller 640, and a sensing unit 650. It should be noted that the components of the wireless power transmitter 600 are not mandatory and more or fewer components may be included.

As shown in FIG. 6, the power converter 610 may perform a function for converting DC power received from the power supply 660 into AC power having a predetermined strength.

The power converter 610 may include a DC-to-DC converter 611, an inverter 612 and a frequency generator 613. Here, the inverter 612 may include a half bridge inverter or a full bridge inverter. However, the embodiment is not limited thereto and the inverter may be a circuit for converting DC power into AC power having a specific operating frequency.

The DC-to-DC converter 611 may perform a function for converting the DC power received from the power supply 650 into DC power having a specific strength according to a control signal of the controller 640.

At this time, the sensing unit 650 may measure the voltage/current of the converted DC power and provide the voltage/current to the controller 640. In addition, the sensing unit 650 may measure the internal temperature of the wireless power transmitter 600 and provide the measured result to the controller 640, in order to determine whether overheating has occurred. For example, the controller 640 may adaptively block power supplied from the power supply 650 based on the voltage/current value measured by the sensing unit 650 or block supply of power to the amplifier 612. To this end, a predetermined power blocking circuit for blocking power supplied to the amplifier 612 or blocking power supplied from the power supply 650 may be further provided on one side of the power converter 610.

The inverter 612 may convert the DC-to-DC converted DC power into AC power based on a reference AC signal generated by a frequency generator 613. At this time, the frequency, that is, operating frequency, of the reference AC signal may be dynamically changed according to the control signal of the controller 640. The wireless power transmitter 600 according to the embodiment may adjust the operating frequency to adjust the strength of the transmitted power.

For example, the controller 640 may receive the power reception status information and/or power control signal of the wireless power receiver through the communication unit 630, determine the operating frequency based on the received power reception status information and/or power control signal, and dynamically control the frequency generator 613 to generate the determined operating frequency.

For example, the power reception status information may include the strength information of a rectifier output voltage, the strength information of current applied to a reception coil, etc., without being limited thereto. The power control signal may include a signal for requesting power increase, a signal for requesting power decrease, etc.

The power transmission unit 620 may include a multiplexer 621 and a transmission coil unit 622. Here, the transmission coil unit 622 may include first to n-th transmission coils. In addition, the power transmission unit 620 may further include a carrier generator (not shown) for generating a specific carrier frequency for power transfer. In this case, the carrier generator may generate a specific carrier frequency for mixing with the output AC power of the inverter 612 received through the multiplexer 621.

It should be noted that the frequencies of the AC power transmitted to the transmission coils are different in the embodiment. In another embodiment, the resonant frequencies of the transmission coils may be differently set using a predetermined frequency controller including a function for differently adjusting LC resonant characteristics according to the transmission coils.

The multiplexer 621 may perform a switch function for transmitting the AC power to the transmission coil selected by the controller 640. The controller 640 may select a transmission coil to be used for power transfer to the wireless power receiver based on the received signal strength indicator of each transmission coil.

When a plurality of wireless power receivers is connected, the controller 640 according to the embodiment may transmit power through time-division multiplexing of the transmission coils.

For example, when three wireless power receivers, that is, first to third wireless power receivers, are identified using three transmission coils, that is, first to third transmission coils, in the wireless power transmitter 600, the controller 640 may control the multiplexer 621 to transmit AC power at a specific time slot only through a specific transmission coil.

At this time, the amount of power transmitted to the wireless power receiver may be controlled according to the length of the time slot allocated to each transmission coil. However, this is only an embodiment and the strength of the output DC power of the DC-to-DC converter 611 may be controlled during a time slot allocated to each transmission coil to control the transmission power of each wireless power receiver.

The controller 640 may control the multiplexer 621 to sequentially transmit sensing signals through the first to n-th transmission coils 622 during a primary sensing signal transmission procedure. At this time, the controller 640 may identify a time when the sensing signal will be transmitted using a timer 655, and control the multiplexer 621 to transmit the sensing signal through the transmission coil when a sensing signal transmission time arrives. For example, the timer 650 may transmit a specific event signal to the controller 640 at predetermined periods during the ping transmission phase, and the controller 640 may control the multiplexer 621 to transmit a digital ping through the transmission coil whenever the event signal is sensed.

In addition, the controller 640 may receive a predetermined transmission coil identifier for identifying through which transmission coil a signal strength indicator has been received from a demodulator 632 during the primary sensing signal transmission procedure, and the signal strength indicator received through the transmission coil.

For example, in a secondary sensing signal transmission procedure, the controller 640 may control the multiplexer 621 to transmit the sensing signal only through the transmission coil(s), through which the signal strength indicator has been received during the primary sensing signal transmission procedure.

In another example, if there are plural transmission coils, through which the signal strength indicator has been received during the primary sensing signal transmission procedure, the controller 640 may determine a transmission coil, through which a signal strength indicator having a largest value has been received, as a transmission coil, through which the sensing signal will be first transmitted in the secondary sensing signal transmission procedure, and control the multiplexer 621 according to the result of determination.

The communication unit 630 may include at least one of a modulator 631 and a demodulator 632.

The modulator 631 may modulate the control signal generated by the controller 640 and transmit the modulated signal to the multiplexer 621. Here, a modulation method of modulating the control signal may include a frequency shift keying (FSK) modulation method, a Manchester coding modulation method, a phase shift keying (PSK) modulation method, a pulse width modulation method, a differential biphase modulation method, etc., without being limited thereto.

When the signal received through the transmission coil is detected, the demodulator 632 may demodulate the detected signal and transmit the demodulated signal to the controller 640. Here, the demodulated signal may include a signal strength indicator, an error correction (EC) indicator for power control during wireless power transmission, an end of charge (EOC) indicator, an overvoltage/overcurrent/overheating indicator, etc. However, the embodiment is not limited thereto and various types of status information for identifying the status of the wireless power receiver may be included.

In addition, the demodulator 632 may identify through which transmission coil the demodulated signal has been received and provide a predetermined transmission coil identifier corresponding to the identified transmission coil to the controller 640.

In addition, the demodulator 632 may demodulate the signal received through the transmission coil 622 and transmit the demodulated signal to the controller 640. For example, the demodulated signal may include a signal strength indicator. However, the embodiment is not limited thereto and the demodulated signal may include various types of status information of the wireless power receiver.

For example, the wireless power transmitter 600 may acquire the signal strength indicator through in-band communication for performing communication with the wireless power receiver using the same frequency used for wireless power transfer.

In addition, the wireless power transmitter 600 may transmit wireless power using the transmission coil unit 622 and exchange various types of control signals and status information with the wireless power receiver through the transmission coil unit 622. In another example, it should be noted that the wireless power transmitter 600 may further include separate coils corresponding to the first to n-th transmission coils of the transmission coil unit 622, and in-band communication with the wireless power receiver may be performed using the separate coils.

Although the wireless power transmitter 600 and the wireless power receiver perform in-band communication in the description of FIG. 6, this is merely an embodiment and short-range bidirectional communication may be performed through a frequency band different from a frequency band used for wireless power signal transmission. For example, the short-range bidirectional communication may be any one of low-power Bluetooth communication, RFID communication, UWB communication and ZigBee communication.

In addition, although the power transmission unit 620 of the wireless power transmitter 600 includes the multiplexer 621 and the plurality of transmission coils 622 in the description of FIG. 6, this is merely an embodiment and it should be noted that the power transmission unit 620 according to another embodiment may include one transmission coil.

Figure 7:
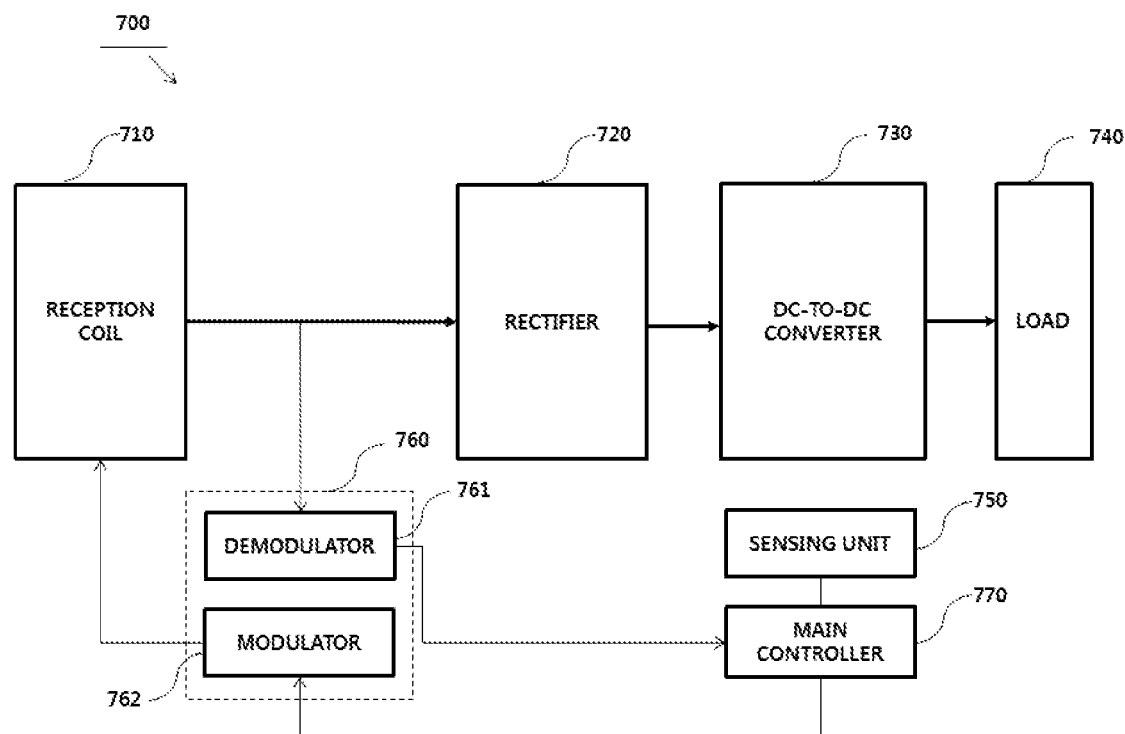
FIG. 7 is a block diagram illustrating the structure of a wireless power receiver interworking with a wireless power transmitter according to an embodiment.

FIG. 7 is a block diagram illustrating the structure of a wireless power receiver interworking with the wireless power transmitter shown in FIG. 6.

Referring to FIG. 7, the wireless power receiver 700 may include a reception coil 710, a rectifier 720, a DC-to-DC converter 730, a load 740, a sensing unit 750, a communication unit 760, and a main controller 770. The communication unit 760 may include a demodulator 761 and a modulator 762.

Although the wireless power receiver 700 shown in the example of FIG. 7 is shown as exchanging information with the wireless power transmitter 600 through in-band communication, this is merely an embodiment and the communication unit 760 according to another embodiment may provide short-range bidirectional communication through a frequency band different from a frequency band used to transmit a wireless power signal.

AC power received through the reception coil 710 may be transmitted to the rectifier 720. The rectifier 720 may convert the AC power into DC power and transmit the DC power to the DC-to-DC converter 730. The DC-to-DC converter 730 may convert the strength of the DC power output from the rectifier into a specific strength required by the load 740 and transmit the converted power to the load 740.

The sensing unit 750 may measure the strength of the DC power output from the rectifier 720 and provide the strength to the main controller 770. In addition, the sensing unit 750 may measure the strength of current applied to the reception coil 710 according to wireless power reception and transmit the measured result to the main controller 770. In addition, the sensing unit 750 may measure the internal temperature of the wireless power receiver 700 and provide the measured temperature value to the main controller 770.

For example, the main controller 770 may compare the strength of the DC power output from the rectifier with a predetermined reference value and determine whether overvoltage occurs. Upon determining that overvoltage occurs, a predetermined packet indicating that overvoltage has occurred may be generated and transmitted to the modulator 762. The signal modulated by the modulator 762 may be transmitted to the wireless power transmitter 600 through the reception coil 710 or a separate coil (not shown).

If the strength of the DC power output from the rectifier is equal to or greater than the predetermined reference value, the main controller 770 may determine that a sensing signal is received and perform control to transmit a signal strength indicator corresponding to the sensing signal to the wireless power transmitter 600 through the modulator 762 upon receiving the sensing signal. In another example, the demodulator 761 may demodulate the AC power signal between the reception coil 710 and the rectifier 720 or the DC power signal output from the rectifier 720, identify whether a sensing signal is received, and provide the identified result to the main controller 770. At this time, the main controller 770 may perform control to transmit the signal strength indicator corresponding to the sensing signal through the modulator 762.

Figure 8:
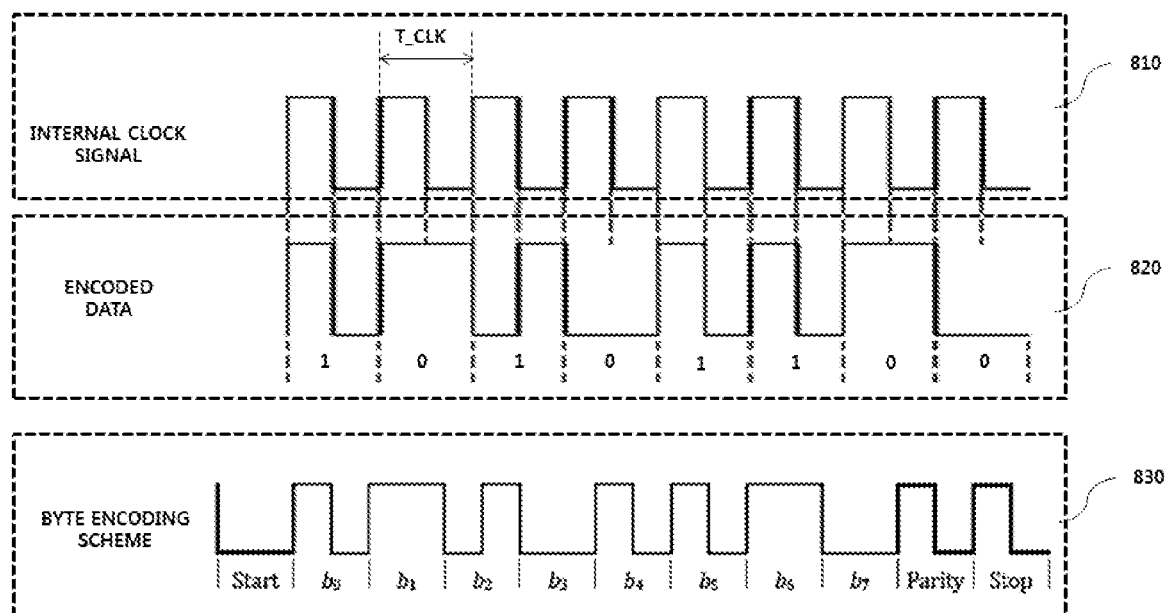
FIG. 8 is a diagram illustrating a method of modulating and demodulating a wireless power signal according to an embodiment.

FIG. 8 is a diagram illustrating a method of modulating and demodulating a wireless power signal according to an embodiment.

As denoted by reference numeral 810 of FIG. 8, the wireless power transmission end 10 and the wireless power reception end 20 may encode or decode a packet to be transmitted based on internal clock signals having the same period.

Hereinafter, the method of encoding the packet to be transmitted will be described in detail with reference to FIGS. 1 to 8.

Referring to FIG. 1, when the wireless power transmission end 10 or the wireless power reception end 20 does not transmit a specific packet, the wireless power signal may be an unmodulated AC signal having a specific frequency as denoted by reference numeral 41 of FIG. 1.

In contrast, when the wireless power transmission end 10 or the wireless power reception end 20 transmits a specific packet, the wireless power signal may be an AC signal modulated using a specific modulation method as denoted by reference numeral 42 of FIG. 1. For example, the modulation method may include an amplitude modulation method, a frequency modulation method and a frequency and amplitude modulation method, a phase modulation method, etc., without being limited thereto.

The binary data of the packet generated by the wireless power transmission end 10 or the wireless power reception end 20 may be subjected to differential biphase encoding as denoted by reference numeral 820. Specifically, differential biphase encoding have two status transitions to encode data bit 1 and have one state transition to encode data bit 0. That is, data bit 1 is encoded such that transition between a HI state and a LO state occurs in the rising edge and the falling edge of the clock signal and data bit 0 is encoded such that transition between the HI state and the LO state occurs in the rising edge of the clock signal.

The encoded binary data may be subjected to a byte encoding scheme denoted by reference numeral 830. Referring to reference numeral 830, the byte encoding scheme according to the embodiment may refer to a method of inserting, into an encoded 8-bit binary bit stream, a start bit and a stop bit for identifying start and stop of the bit stream and a parity bit for sensing error of the bit stream (byte).

Figure 9:
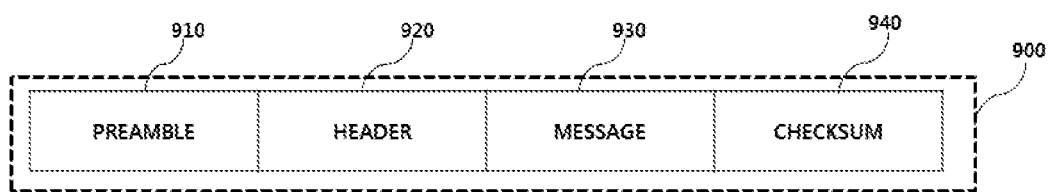
FIG. 9 is a diagram illustrating a packet format according to an embodiment.

FIG. 9 is a view illustrating a packet format according to an embodiment.

Referring to FIG. 9, the packet format 900 used for information exchange between the wireless power transfer end 10 and the wireless power reception end 20 may include a preamble 910 field for acquiring synchronization for demodulation of the corresponding packet and identifying an accurate start bit of the corresponding packet, a header 920 field for identifying the type of a message included in the corresponding packet, a message 930 field for transmitting the content (or payload) of the corresponding packet, and a checksum 940 field for identifying whether an error has occurred in the corresponding packet.

A packet reception end may identify the size of the message 930 included in the corresponding packet based on the value of the header 920.

In addition, the header 920 may be defined for each step of the wireless power transfer procedure, and the value of the header 920 may be defined as the same value in different phases of the wireless power transmission procedure. For example, referring to FIG. 10, it should be noted that the header value corresponding to end power transfer of the ping phase and end power transfer of the power transfer phase is 0x02.

The message 930 includes data to be transmitted by the transmission end of the corresponding packet. For example, the data included in the message 930 field may be a report, a request, or a response, without being limited thereto.

The packet 900 according to another embodiment may further include at least one of transmission end identification information for identifying the transmission end for transmitting the corresponding packet and reception end identification information for identifying the reception end for receiving the corresponding packet. The transmission end identification information and the reception end identification may include IP address information, MAC address information, product identification information, etc. However, the embodiment is not limited thereto and information for distinguishing the reception end and the transmission end in the wireless charging system may be included.

The packet 900 according to another embodiment may further include predetermined group identification information for identifying a reception group if the corresponding packet is received by a plurality of apparatuses.

FIG. 10 is a view illustrating the types of packets transmitted from the wireless power receiver to the wireless power transmitter according to an embodiment.

Referring to FIG. 10, the packet transmitted from the wireless power receiver to the wireless power transmitter may include a signal strength packet for transmitting the strength information of a sensed ping signal, a power transfer type (end power transfer) for requesting power transfer end from the transmitter, a power control hold-off packet for transferring information on a time until actual power is controlled after a control error packet for control is received, a configuration packet for transferring configuration information of the receiver, an identification packet and an extended identification packet for transmitting receiver identification information, a general request packet for transmitting a general request message, a specific request packet for transmitting a specific request message, an FOD status packet for transmitting a reference quality factor value for FO detection, a control error packet for controlling power transmitted by the transmitter, a renegotiation packet for starting renegotiation, a 24-bit received power packet for transmitting the strength information of the received power, and a charge status packet for transmitting the current charging status information of the load.

The packets transmitted from the wireless power receiver to the wireless power transmitter may be transmitted using in-band communication using the same frequency band as the frequency band used to transmit wireless power.

Figure 11A:
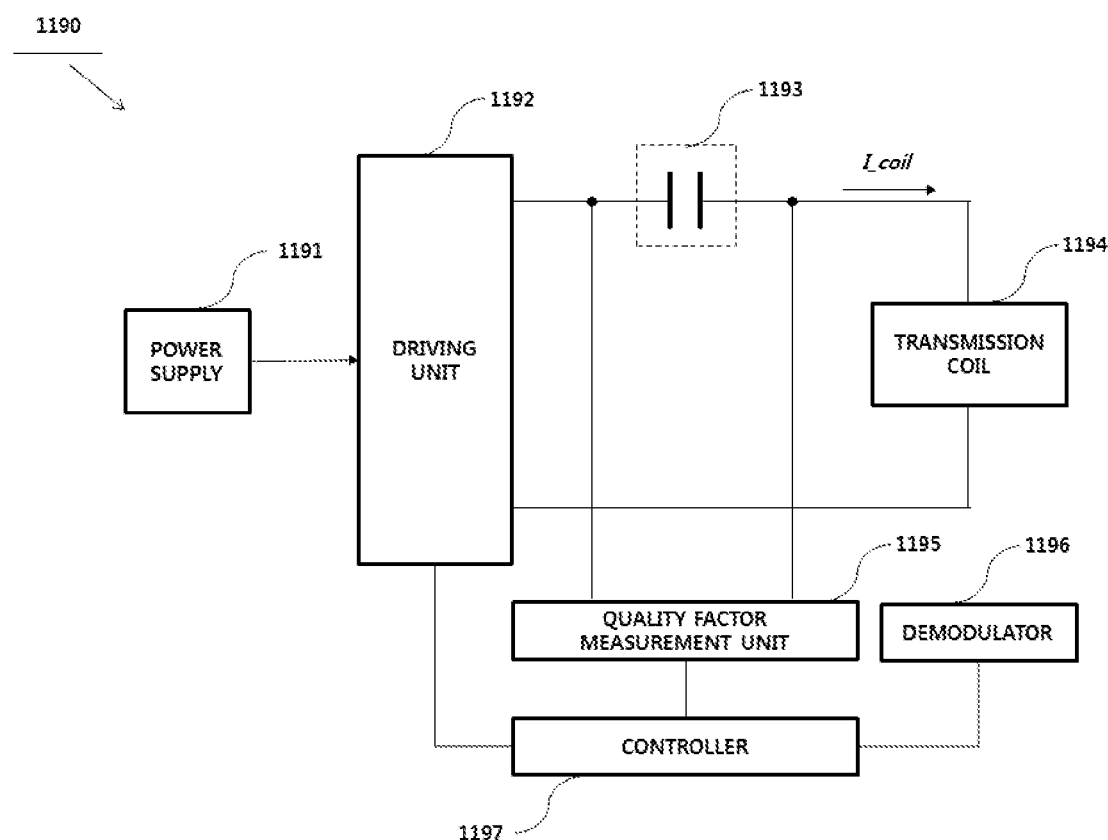
FIGS. 11A and 11B are diagrams illustrating the structure of a foreign object detection apparatus according to an embodiment.

FIG. 11A is a diagram illustrating the basic structure of a foreign object detection apparatus (circuit) installed in a wireless power transmitter according to an embodiment.

Referring to FIG. 11A, the foreign object detection apparatus (circuit) 1190 may include a power supply 1191, a driving unit 1192, a resonant capacitor 1193, a transmission coil 1194, a quality factor measurement unit 1195, a demodulator 1196 and a controller 1197.

The power supply 1191 may receive and supply external power to the driving unit 1192.

The driving unit 1192 may convert the DC power received from the power supply 1191 into AC power and control the strength of the AC power according to a control signal of the controller 1197. The driving unit 1192 may include a frequency oscillator for generating a specific frequency signal and an inverter for amplifying an AC signal oscillated by the frequency oscillator.

The driving unit 1192 may change at least one of the frequency (operating frequency), duty ratio and amplitude of the AC signal according to the control signal of the controller 1197.

The quality factor measurement unit 1195 may monitor change in inductance (or voltage or current) across the resonant capacitor 1193 and measure the quality factor value of the transmission coil. The measured current quality factor value may be transmitted to the controller 1197.

The demodulator 1196 demodulates the signal received from the wireless power receiver and transmits the demodulated signal to the controller 1197. For example, the demodulator 1196 may demodulate the FOD status packet and transmit the demodulated FOD status packet to the controller 1197.

The controller 1197 may receive and store the quality factor value measured by the quality factor measurement unit 1195 in a memory. In addition, the controller 1197 may read the stored quality factor value from the memory. The controller 1197 may control the operating frequency of the driving unit 1192. By controlling the operating frequency of the driving unit 1192, the quality factor measurement unit 1195 may measure the quality factor value of each operating frequency. The controller 1197 may determine a frequency corresponding to a maximum quality factor value, that is, a peak frequency, based on the measured quality factor value of each operating frequency.

The controller 1197 may determine a quality factor threshold value for the wireless power receiver based on at least one of a reference quality factor value included in the FOD status packet, the operating frequency (reference peak frequency) corresponding to the maximum quality factor value, the operating frequency corresponding to a quality factor value less than the reference quality factor value by a predetermined value, for example, the operating frequency at which a quality factor value less than the reference quality factor value by 5% is measured.

The controller 1197 may compare the determined quality factor threshold value with the current quality factor value measured by the quality factor measurement unit 1195 and/or determine whether an FO is present in the charging area based on the received operating frequency (threshold frequency) and the measured or calculated operating frequency, for example, the operating frequency (peak frequency) corresponding to the maximum quality factor value or the operating frequency at which the quality factor value less than the reference quality factor value by 5% is measured.

The controller 1197 according to another embodiment may measure the quality factor value. In this case, the controller 1197 may measure the quality factor value of each frequency while changing the operating frequency within a predetermined operating frequency range. In one embodiment, the controller 1197 may measure the quality factor value using a voltage difference across the resonant capacitor 1193, without being limited thereto.

The quality factor measurement unit 1195 according to one embodiment may include a circuit configuration for measuring and transmitting the voltage across the resonant capacitor 1193 to the controller 1197.

The quality factor value measured by the controller 1197 may correspond to the quality factor value of the transmission coil measured using a measurement apparatus such as an LCR meter for measuring at least one of the voltage, current, resistance, impedance, capacitance and quality factor value of an electric circuit.

The controller 1197 may continuously perform charging, stop charging and returning to the selection phase according to the result of determining whether the foreign object is present.

Figure 11B:
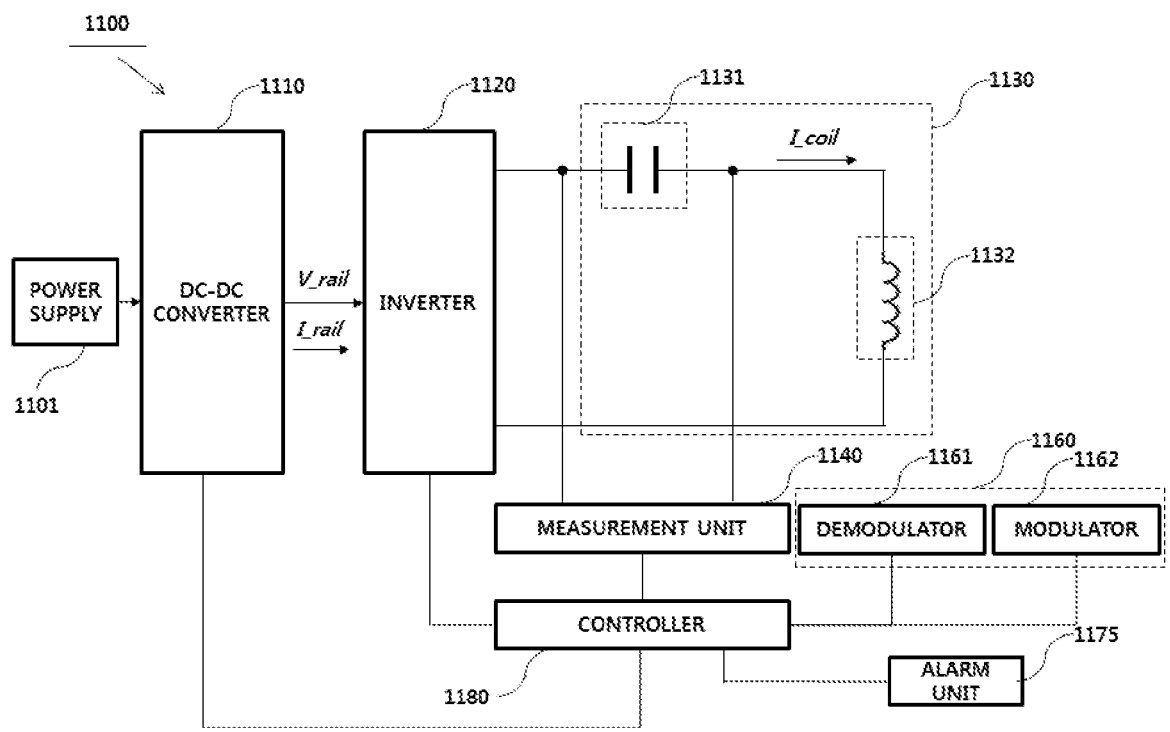

FIG. 11B is a diagram illustrating the structure (an extension of FIG. 11A) of the foreign object detection apparatus (circuit) in the wireless power transmitter according to an embodiment.

Referring to FIG. 11B, the foreign object detection apparatus 1100 may include a power supply 1101, a DC-to-DC converter 1110 (omittable), an inverter 1120, a resonant circuit 1130, a measurement unit 1140, a communication unit 1160, an alarm unit 1175 (omittable), and a controller 1180. The foreign object detection apparatus 1100 according to the present embodiment may be mounted in the wireless power transmission apparatus.

The resonant circuit 1130 may include a resonant capacitor 1131 and an inductor or a transmission coil 1132 or a transmission antenna, and the communication unit 1160 may include at least one of a demodulator 1161 and a modulator 1162.

The power supply 1101 may receive DC power through an external power terminal and transmit the DC power to the DC-to-DC converter 1110.

The DC-to-DC converter 1110 may convert the strength of the DC power received from the power supply 1101 into a specific strength of DC power under control of the controller 1180. For example, the DC-to-DC converter 1110 may include a variable voltage generator capable of adjusting the strength of the voltage, without being limited thereto.

The inverter 1120 may convert the converted DC power into AC power. The inverter 1120 may convert the DC power signal input through control of a plurality of switches into an AC power signal and output the AC power signal.

For example, the inverter 1120 may include a full bridge circuit. However, the embodiment is not limited thereto and the inverter may include a half bridge circuit.

In another example, the inverter 1120 may include a half bridge circuit and a full bridge circuit. In this case, the controller 1180 may dynamically determine whether the inverter 1120 operates as a half bridge or a full bridge.

The wireless power transmission apparatus according to one embodiment may adaptively control the bridge mode of the inverter 1120 according to the strength of the power required by the wireless power reception apparatus. Here, the bridge mode includes a half bridge mode and a full bridge mode. For example, if the wireless power reception apparatus requests low power of 5 W, the controller 1180 may perform control such that the inverter 1120 is driven in the half bridge mode. In contrast, if the wireless power reception apparatus requests high power of 15 W, the controller 1180 may perform control such that the inverter is driven in the full bridge mode.

In another example, the wireless power transmission apparatus may adaptively determine the bridge mode according to a sensed temperature and drive the inverter 1120 in the determined bridge mode. If the temperature of the wireless power transmission apparatus exceeds a predetermined reference value while wireless power is transmitted using the half bridge mode, the controller 1180 may perform control to deactivate the half bridge mode and activate the full bridge mode. That is, the wireless power transmission apparatus may increase the voltage and decrease the strength of current flowing in the resonant circuit 1130 through the full bridge circuit for transmission of power having the same strength, thereby maintaining the internal temperature of the wireless power transmission apparatus at a reference value or less.

In general, the amount of heat generated in an electronic part mounted in the electronic apparatus may be more sensitive to the strength of current than the strength of the voltage applied to the electronic part.

In addition, the inverter 1120 may not only convert the DC power into AC power but also change the strength of the AC power.

For example, the inverter 1120 may adjust the strength of the output AC power by adjusting the frequency of a reference alternating current signal used to generate the AC power under control of the controller 1180. To this end, the inverter 1120 may include a frequency oscillator for generating the reference alternating current signal having a specific frequency. However, this is merely an example and the frequency oscillator may be mounted independently of the inverter 1120 and mounted at one side of the foreign object detection apparatus 1100.

In another example, the foreign object detection apparatus 1100 may further include a gate driver (not shown) for controlling the switch provided in the inverter 1120. In this case, the gate driver may receive at least one pulse width modulation signal from the controller 1180 and control the switch of the inverter 1120 according to the received pulse width modulation signal. The controller 1180 may control the duty cycle, that is, the duty rate, and phase of the pulse width modulation signal to control the strength of the output power of the inverter 1120. The controller 1180 may adaptively control the duty cycle and phase of the pulse width modulation signal based on the feedback signal received from the wireless power reception apparatus.

The measurement unit 1140 may measure at least one of a voltage, current and impedance of the resonant capacitor 1131 according to the control signal of the controller 1180 to measure or calculate the quality factor value and/or peak frequency value of the resonant circuit 1130. At this time, the calculated quality factor value and/or inductance value may be sent to the controller 1180, and the controller 1180 may store the quality factor value and/or the peak frequency value received from the measurement unit 1140 in a predetermined recording region.

The measurement unit 1140 may measure and store the quality factor value corresponding to a predetermined reference operating frequency, that is, a reference measured quality factor value, according to a control signal of the controller 1180.

Alternatively, the measurement unit 1140 may measure the quality factor value of each frequency within a specific operating frequency range according to a control signal of the controller 1180. The controller 1180 may determine a peak frequency value corresponding to a maximum quality factor value and store the peak frequency value in the memory.

When an object is detected, the controller 1180 according to the embodiment may control the measurement unit 1140 to measure the quality factor values at a plurality of frequencies within the operating frequency band before entering the ping phase. The controller 1180 may identify a frequency corresponding to a largest value among the measured quality factor values and determine the identified frequency as a current peak frequency.

When the FOD status packet is received from the modulator 1162 in the negotiation phase, the controller 1180 may determine a threshold value (or a threshold range) for determining whether a foreign object is present based on information included in the FOD status packet. Here, the threshold value may include at least one of the peak frequency value and the quality factor threshold value. If the determined value is a threshold range, the threshold range may include at least one of a peak frequency threshold range and a quality factor threshold range.

Here, the FOD status packet may include at least one of a reference quality factor value corresponding to the wireless power receiver and/or a reference peak frequency F_reference_peak value.

The controller 1180 may determine the quality factor threshold value and/or the peak frequency threshold value for determining whether the foreign object is present based on the received reference quality factor value and the reference peak frequency value. For example, although a value corresponding to 90% of the reference quality factor value may be determined as the quality factor threshold value, the embodiment is not limited thereto and the ratio applied to determine the threshold value may be differently defined according to the design of those skilled in the art.

The controller 1180 may calibrate the reference measured quality factor value Q_measured_reference based on a difference between the current peak frequency F_current_peak value and a reference peak frequency F_reference_peak value. For example, as a value obtained by subtracting the reference peak frequency value from the current peak frequency value increases, the reference measured quality factor value may increase. To this end, a specific calibration function using the difference between the current peak frequency F_current_peak and the reference peak frequency F_reference_peak as a factor may be predefined. For example, the calibration function may be a linear function. However, the embodiment is not limited thereto and a nonlinear function such as an exponential function may be defined. In another example, a quality factor calibration value corresponding to a degree of shift of the current peak frequency from the reference peak frequency may be configured and maintained in the form of a table in a predetermined recording region of the foreign object detection apparatus 1100.

The controller 1180 may compare the calibrated reference measured quality factor value with the determined quality factor threshold value to detect the foreign object placed in the charging area.

For example, the controller 1180 may determine that the foreign object is present in the charging area when the calibrated reference measured quality factor value is less than the determined quality factor threshold value. In contrast, the controller 1180 may determine that the foreign object is not present in the charging area when the calibrated reference measured quality factor value is equal to or greater than the determined quality factor threshold value.

In addition, the controller 1180 may calibrate the quality factor threshold value based on the difference between the current peak frequency F_current_peak value and the reference peak frequency F_reference_peak value. The controller 1180 may perform calibration, such that the quality factor threshold value increases as the value obtained by subtracting the reference peak frequency from the current peak frequency value increases. The controller 1180 may compare the quality factor threshold value with the measured quality factor value to detect the foreign object placed in the charging area.

The controller 1180 may stop power transfer upon determining that the foreign object is present and control the alarm unit 1175 to output a predetermined warning alarm indicating that the foreign object has been detected. For example, the alarm unit 1175 may include, but is not limited to, a beeper, an LED lamp, a vibration element, a liquid crystal display, etc. However, the embodiment is not limited thereto and a predetermined alarm unit configured to inform the user that the foreign object has been detected may be provided.

The reference quality factor value included in the FOD status packet may be determined to be the smallest value of the quality factor values calculated in correspondence with the wireless power receiver at a specific position of a charging bed of a wireless power transmitter specified for standard performance test.

In addition, if the foreign object is detected in the negotiation phase, the controller 1180 may return to the selection phase and control the measurement unit 1140 to measure the quality factor value at a specific operating frequency and/or the peak frequency in the operating frequency band at predetermined periods. At this time, the controller 1180 may perform comparison with a predetermined threshold value in a state in which the foreign object is detected, thereby determining whether the detected foreign object has been removed.

Upon determining that the foreign object has been removed, the controller 1180 may enter the power transfer phase to perform charging of the wireless power reception device. The demodulator 1161 demodulates an in-band signal received from the wireless power reception apparatus and transmits the demodulated signal to the controller 1180. For example, the demodulator 1161 may demodulate the FOD status packet of FIG. 14 or 15 and transmit the demodulated FOD status packet to the controller 1180.

As described above, the foreign object detection apparatus 1100 according to the disclosure adaptively calibrates the measured quality factor value based on the degree of shift of the peak frequency when the object is detected in the selection phase, thereby remarkably decreasing a probability of foreign object detection failure.

Figure 12:
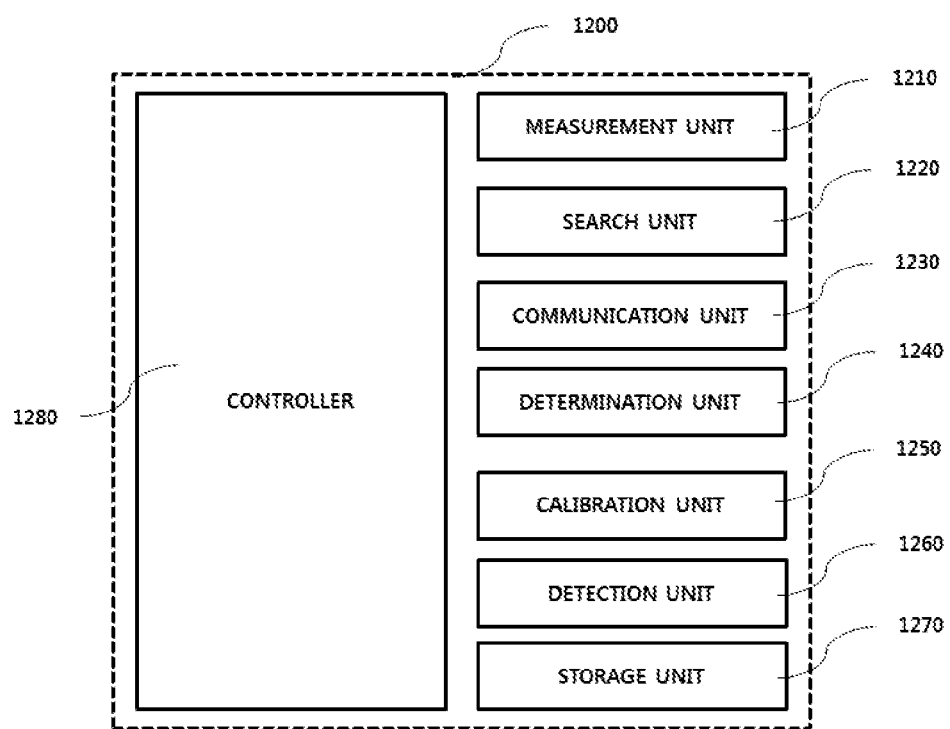
FIG. 12 is a block diagram illustrating the structure of a foreign object detection apparatus according to another embodiment.

FIG. 12 is a block diagram illustrating the structure of a foreign object detection apparatus according to another embodiment.

Referring to FIG. 12, the foreign object detection apparatus 1200 may include a measurement unit 1210, a search unit 1220, a communication unit 1230, a determination unit 1240, a calibration unit 1250, a detection unit 1260, a storage unit 1270 and a controller 1280. It should be noted that the components of the foreign object detection apparatus 1200 are not mandatory and more or fewer components may be included.

Upon detecting that an object has been placed in the charging area in the selection phase, the measurement unit 1210 may temporarily stop power transfer and measure the quality factor value at a predetermined reference operating frequency. For convenience of description, hereinafter, a current quality factor value measured at the reference operating frequency is referred to as a measured quality factor value Q_measured. The reference operating frequency may be set to a specific frequency included in the operating frequency band. For example, if the wireless power transmission apparatus in which the foreign object detection apparatus 1200 is installed supports the WPC standard, the reference operating frequency may be 100 kHz. However, it should be noted that the embodiment is not limited thereto and the reference operating frequency may be differently defined according to the applied standard.

Upon detecting that an object has been placed in the charging area in the selection phase, the search unit 1220 may temporarily stop power transfer and search for a frequency having a maximum quality factor value in the operating frequency band. Here, a frequency search offset for searching for the frequency having the maximum quality factor value may be set in units of 10 kHz*k (k being a natural number), without being limited thereto. For convenience of description, hereinafter, a frequency having a maximum quality factor value in an operating frequency band searched after detecting an object is referred to as a current peak frequency F_current_peak. In contrast, a frequency having a maximum quality factor value acquired through a preliminary experiment in a state in which only a wireless power receiver is placed in a charging area is referred to as a reference peak frequency F_reference_peak.

If a foreign object is placed in the charging area in addition to the wireless power receiver, the frequency having the maximum quality factor value searched within the operating frequency band may have a greater value than the reference peak frequency acquired when only the wireless power receiver is placed in the charging area.

The measured quality factor value measured by the measurement unit 1210 and the current peak frequency value searched by the search unit 1220 may be stored in a predetermined recording region of the storage unit 1270.

The communication unit 1230 may receive a foreign object detection (FOD) status packet from the wireless power receiver in the negotiation phase. Here, the foreign object detection status packet may include at least one of information on the reference peak frequency value and information on the reference quality factor value. The structure of the foreign object detection status packet will become apparent through the description of FIGS. 14 to 15.

The determination unit 1240 may determine a quality factor threshold value for determining whether a foreign object is present based on the reference quality factor value included in the foreign object detection status packet. For example, the quality factor threshold value may be set to a value less than the reference quality factor value by 10%. However, this is merely an embodiment and other ratios may be applied according to the design purpose of a person skilled in the art.

The calibration unit 1250 may calibrate the quality factor threshold value Q_threshold based on a difference between a current peak frequency F_current_peak and a reference peak frequency F_reference_peak. For example, as a value obtained by subtracting the reference peak frequency value from the current peak frequency value increases, the quality factor threshold value may increase. To this end, a specific calibration function using the difference between the current peak frequency F_current_peak and the reference peak frequency F_reference_peak as factors may be predefined. For example, the calibration function may be a linear function. However, the embodiment is not limited thereto and a nonlinear function such as an exponential function may be defined.

The calibration unit 1250 according to another embodiment may set the calibration amount of the reference measured quality factor value based on not only the difference between the current peak frequency F_current_peak and the reference peak frequency F_reference_peak but also the reference quality factor value. For example, as a value obtained by subtracting the reference peak frequency value from the current peak frequency value increases, the calibration amount of the quality factor threshold value may increase.

Hereinafter, for convenience of description, the quality factor threshold value calibrated by the calibration unit 1250 may be referred to as a calibrated quality factor threshold value Q_threshold_fixed.

The detection unit 1260 may compare the quality factor threshold value determined by the determination unit 1240 with the calibrated quality factor threshold value calculated by the calibration unit 1250 to determine whether a foreign object is present in the charging area. For example, when the current quality factor value is less than the calibrated quality factor threshold value, the detection unit 1260 may determine that the foreign object is present in the charging area. In contrast, when the current quality factor value is equal to or greater than the calibrated quality factor threshold value, the detection unit 1260 may determine that the foreign object is not present in the charging area.

The control unit 1280 may control overall operation of the foreign object detection apparatus 1200 and, particularly, may control operation of the sub-components according to the wireless power transfer phase. The sub-components include the measurement unit 1210, the search unit 1220, the communication unit 1230, the determination unit 1240, the calibration unit 1250 and the detection unit 1260.

In general, the reference quality factor value measured at the reference operating frequency may vary according to the type of the wireless power reception apparatus. In addition, the frequency value having the maximum quality factor value in the operating frequency band may vary according to the type of the wireless power reception apparatus.

Accordingly, the foreign object detection apparatus 1200 may receive the reference quality factor value and the reference peak frequency value corresponding to the wireless power reception apparatus through the foreign object detection (FOD) status packet.

As described above, when an object is detected in the selection phase, the foreign object detection apparatus 1200 according to the disclosure may adaptively calibrate the measured quality factor value according to the degree of shift of the peak frequency, thereby remarkably decreasing a probability of foreign object detection failure.

Figure 13A:
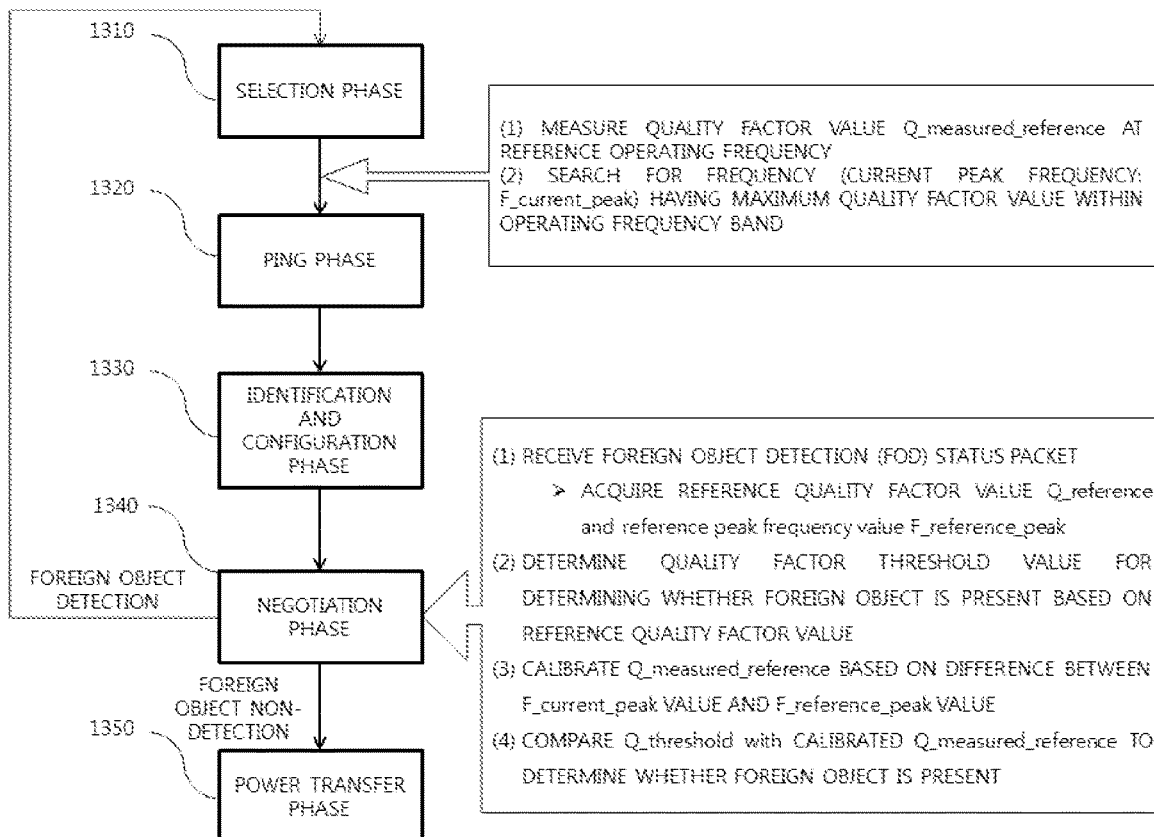
FIGS. 13A to 13D are state transition diagrams explaining foreign object detection in a foreign object detection apparatus according to an embodiment.

FIG. 13A is a state transition diagram explaining foreign object detection in a foreign object detection apparatus according to an embodiment.

Referring to FIG. 13A, when the object is detected in the selection phase 1310, the foreign object detection apparatus may measure the current quality factor value at the reference operating frequency, that is, the measured quality factor value Q_measured.

In addition, when the object is detected in the selection phase 1310, the foreign object detection apparatus may measure the quality factor values at a plurality of frequencies before entering the ping phase 1320 and search for a frequency having a maximum quality factor value, that is, a current peak frequency F_current_peak.

In the ping phase 1320, the foreign object detection apparatus may periodically transmit a predetermined power signal for identifying the wireless power receiver, for example, a digital ping.

The foreign object detection apparatus may store information on the measured quality factor values and the current peak frequency value in the predetermined recording region.

When a signal strength indicator is received in the ping phase 1320, the foreign object detection apparatus may enter the identification and configuration phase 1330 to identify the wireless power receiver and to set various configuration parameters for the identified wireless power receiver.

When identification and configuration of the wireless power receiver end, the foreign object detection apparatus may enter the negotiation phase 1340 to perform a foreign object detection procedure.

The foreign object detection procedure may be performed through the following four steps.

In step 1, the foreign object detection apparatus may receive at least one foreign object detection status packet from the identified wireless power receiver. Here, the foreign object detection status packet may include at least one of information on the reference peak frequency value and information on the reference quality factor value.

The information on the reference quality factor value may mean a quality factor value measured at a reference operating frequency in a state in which the wireless power receiver is powered off. Powering off the receiver may mean a state in which power is not transmitted to a load. The information on the reference peak frequency value may mean a frequency having a maximum quality factor within the operating frequency band in a state in which only the wireless power receiver is placed in the charging area of a predetermined wireless power transmitter. The wireless power receiver may store a reference peak frequency value in advance and transmit the reference peak frequency value to the wireless power transmitter in the negotiation phase.

In step 2, the foreign object detection apparatus may determine a quality factor threshold value for determining whether a foreign object is present based on the received reference quality factor value.

In step 3, the foreign object detection apparatus may calibrate (or compensate for) the reference measured quality factor $Q\_measured\_reference$ value based on a difference between the current peak frequency value and the reference peak frequency value. For example, the calibrated $Q\_measured\_reference$ value may be obtained by adding the difference between the current peak frequency value and the reference peak frequency value to the $Q\_measured\_reference$ value. Alternatively, the calibrated $Q\_measured\_reference$ value may be obtained by adding a product of the difference between the current peak frequency value and the reference peak frequency value and a predetermined weight to the $Q\_measured\_reference$ value.

In step 4, the foreign object detection apparatus may compare the quality factor threshold value with the calibrated reference measured quality factor value to determine whether a foreign object is present.

Upon determining that the foreign object is present, the foreign object detection apparatus may stop power transfer and return to the selection phase 1310. Alternatively, an indicator indicating that the foreign object is present may be transmitted to the wireless power receiver, and the wireless power receiver may request End of Power Transfer or ignore the indicator and proceed to the subsequent phase in order to continuously perform charging. In contrast, upon determining that the foreign object is not present, the foreign object detection apparatus may enter the power transfer phase 1350 to start wireless charging of the wireless power receiver.

Figure 13B:
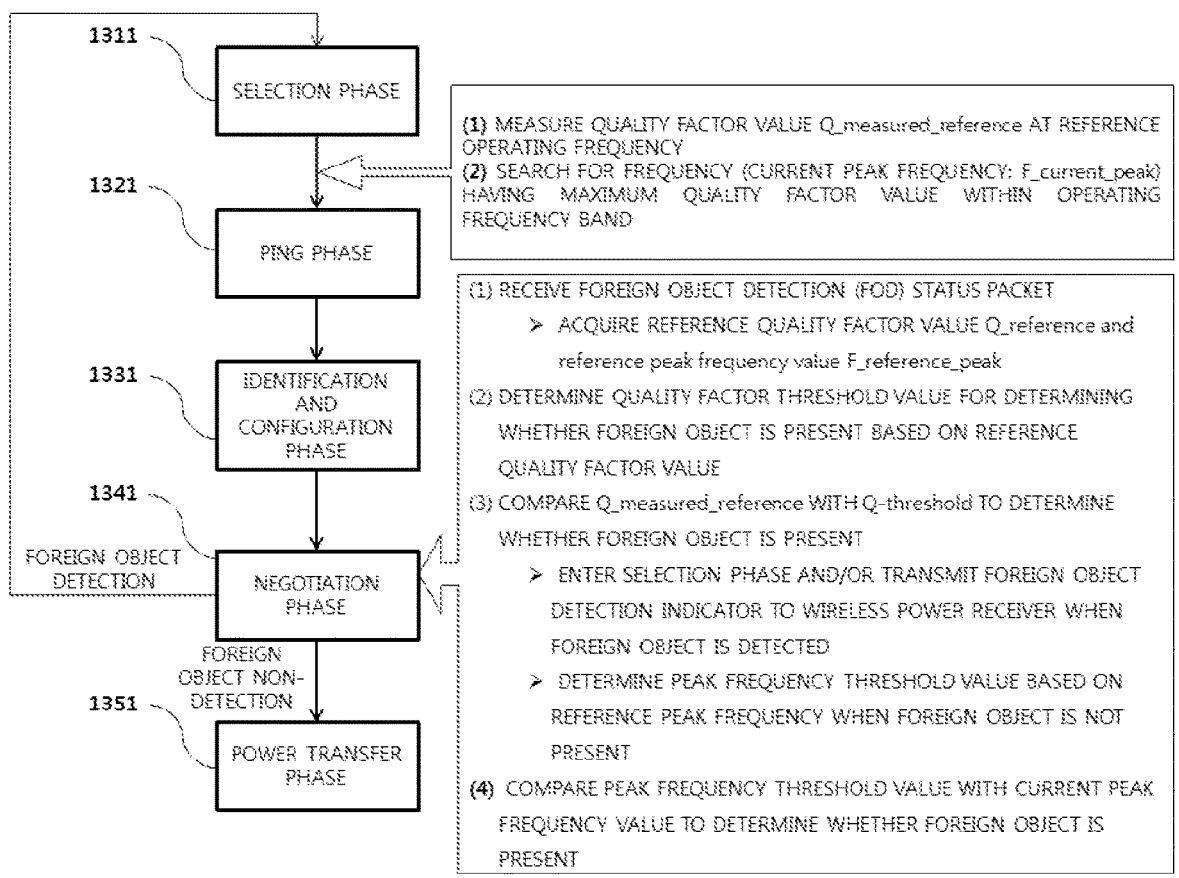

FIG. 13B is a diagram illustrating a state transition diagram explaining foreign object detection in a foreign object detection apparatus according to another embodiment.

Referring to FIG. 13B, when the object is detected in the selection phase 1311, the foreign object detection apparatus may measure the current quality factor value at the reference operating frequency, that is, the measured quality factor value $Q\_measured$.

In addition, when the object is detected in the selection phase 1311, the foreign object detection apparatus may measure the quality factor values at a plurality of frequencies before entering the ping phase 1321 and search for a frequency having a maximum quality factor value, that is, a current peak frequency $F\_current\_peak$.

In the ping phase 1321, the foreign object detection apparatus may periodically transmit a predetermined power signal for identifying the wireless power receiver, for example, a digital ping.

The foreign object detection apparatus may store information on the measured quality factor values and the current peak frequency value in the predetermined recording region.

When a signal strength indicator is received in the ping phase 1321, the foreign object detection apparatus may enter the identification and configuration phase 1331 to identify the wireless power receiver and set various configuration parameters for the identified wireless power receiver.

When identification and configuration of the wireless power receiver end, the foreign object detection apparatus may enter the negotiation phase 1341 to perform a foreign object detection procedure.

The foreign object detection procedure may be performed through the following four steps.

In step 1, the foreign object detection apparatus may receive at least one foreign object detection status packet from the identified wireless power receiver. Here, the foreign object detection status packet may include at least one of information on the reference peak frequency value and information on the reference quality factor value.

The information on the reference quality factor value may mean a quality factor value measured at a reference operating frequency in a state in which the wireless power receiver is powered off. Powering off the receiver may mean a state in which power is not transmitted to a load. The information on the reference peak frequency value may mean a frequency having a maximum quality factor within the operating frequency band in a state in which only the wireless power receiver is placed in the charging area of a predetermined wireless power transmitter. The wireless power receiver may store a reference peak frequency value in advance and transmit the reference peak frequency value to the wireless power transmitter in the negotiation phase 1341.

In step 2, the foreign object detection apparatus may determine a quality factor threshold value for determining whether a foreign object is present based on the received reference quality factor value.

In step 3, the foreign object detection apparatus may compare the quality factor threshold value with the measured quality factor value to determine whether a foreign object is present.

Upon determining that the foreign object is present, the foreign object detection apparatus according to the embodiment may stop power transfer and return to the selection phase 1310. The foreign object detection apparatus according to another embodiment may transmit a predetermined foreign object detection indicator indicating that a foreign object is present to the wireless power receiver. At this time, when the foreign object detection indicator is received, the wireless power receiver may request End of Power Transfer or ignore the indicator, that is, may not transmit an Ack response signal corresponding to the foreign object detection indicator, and proceed to the subsequent phase in order to continuously perform charging.

In contrast, upon determining that the foreign object is not present, the foreign object detection apparatus may determine whether the reference peak frequency value has been received.

The foreign object detection apparatus according to one embodiment may determine that the reference peak frequency value has been received, when the reference peak frequency value included in the foreign object detection status packet is greater than 0.

When the reference peak frequency value is not received, the foreign object detection apparatus may enter the power transfer phase 1350 to start wireless charging of the wireless power receiver.

When the reference peak frequency value is received, the foreign object detection apparatus may determine a peak frequency threshold value based on the reference peak frequency value.

In step 4, the foreign object detection apparatus may compare the peak frequency threshold value with the current peak frequency value to determine whether a foreign object is present. When the current peak frequency value is greater than the peak frequency threshold value, it is determined that the foreign object is present. Then, the foreign object detection apparatus may stop power transfer and return to the selection phase 1311. Alternatively, an indicator indicating that the foreign object is present may be transmitted to the wireless power receiver, and the wireless power receiver may request End of Power Transfer or ignore the indicator and proceed to the subsequent phase in order to continuously perform charging. In contrast, upon determining that the foreign object is not present, the foreign object detection apparatus may enter the power transfer phase 1351 to start wireless charging of the wireless power receiver.

As another embodiment, in the embodiment of FIG. 13B, the foreign object detection apparatus may first perform a procedure of determining whether the reference peak frequency value has been received from the wireless power receiver before the foreign object detection procedure based on the quality factor value.

At this time, upon determining that the reference peak frequency value has been received, the foreign object detection apparatus may perform the foreign object detection procedure based on the quality factor value and the foreign object detection procedure based on the peak frequency to determine whether a foreign object is present.

In contrast, upon determining that the reference peak frequency value has not been received, the foreign object detection apparatus may perform only the foreign object detection procedure based on the quality factor value to determine whether a foreign object is present.

If the foreign object detection procedure is differently performed depending on whether the reference peak frequency is received, the foreign object detection procedure may be performed in a manner preferred by the wireless power receiver. In addition, by previously setting the foreign object detection method optimized for a device, in which the wireless power receiver is mounted, in the manufacturing step, it is possible to increase foreign object detection accuracy. Of course, it should be noted that a foreign object detection method corresponding to the wireless power receiver, that is, whether reference peak frequency information is transmitted or not, may be changed through predetermined menu settings. In one embodiment, the wireless power receiver may identify the type and characteristics of the wireless power transmitter and determine a foreign object detection method optimized for the identified type and characteristics. In this case, the wireless power receiver may adaptively determine whether the reference peak frequency information is transmitted or not according to the determined foreign object detection method.

Figure 13C:
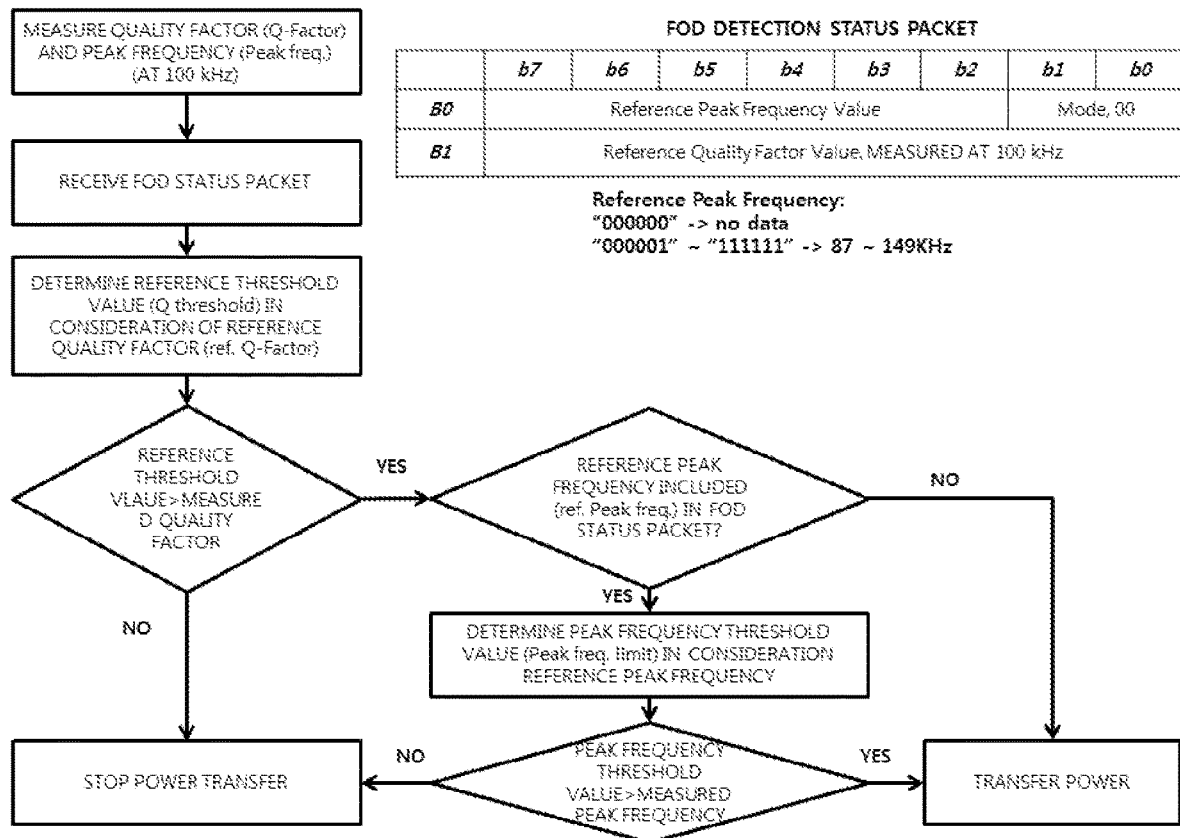

FIG. 13C is a diagram illustrating a foreign object detection procedure according to another embodiment.

A wireless power transmitter may measure the quality factor value of a resonant circuit when an object is detected in a charging area. The quality factor of the resonant circuit may mean an amplification ratio of the input/output voltage by the resonant capacitor when AC power having a specific frequency is applied to the resonant circuit. For this, refer to the description of FIGS. 11A and 11B. At this time, the quality factor value of each frequency may be measured within the operating frequency range of the wireless power transmitter.

The wireless power transmitter may determine a current quality factor value and a peak frequency (a frequency at which a maximum quality factor value is measured in the measured frequency range) through quality factor measurement and store the current quality factor value and the peak frequency in a memory.

The wireless power transmitter may receive a foreign object detection status packet. For the foreign object detection status packet, refer to the description of FIGS. 14A to 14B.

The wireless power transmitter may determine the quality factor threshold value based on the received reference quality factor value.

The wireless power transmitter may determine whether a foreign object is present using the quality factor threshold value and the measured quality factor value.

For example, when the current quality factor value is greater than or equal to the quality factor threshold value, the wireless power transmitter may determine that a foreign object is present. When the current quality factor value is less than the quality factor threshold value, the wireless power transmitter may determine whether information on the reference peak frequency is included in the foreign object detection status packet. (see FIG. 14)

If the information on the reference peak frequency is not included in the foreign object detection status packet, the wireless power transmitter may determine that a foreign object is not present. At this time, a subsequent phase (e.g., calibration or power transfer) for wireless power transfer may be performed.

If the information on the reference peak frequency is included, the wireless power transmitter may further determine whether a foreign object is present based on the received information on the reference peak frequency. The wireless power transmitter may determine a peak frequency threshold value using the reference peak frequency value. The wireless power transmitter may compare the peak frequency threshold value with the current peak frequency and determine that a foreign object is present when the current peak frequency is equal to or greater than the peak frequency threshold value. In contrast, when the current peak frequency is less than the peak frequency threshold value, the wireless power transmitter may determine that a foreign object is not present.

Depending on whether a foreign object is present, the wireless power transmitter may determine whether wireless power transfer is performed or stopped.

In another embodiment, the procedure of determining whether a foreign object is present based on the quality factor value and the procedure of determining whether a foreign object is present based on the peak frequency may be performed in a reverse order. That is, the procedure of determining whether a foreign object is present based on the peak frequency may be performed first and then the procedure of determining whether a foreign object is present based on the quality factor value, thereby improving foreign object detection capability.

Figure 13D:
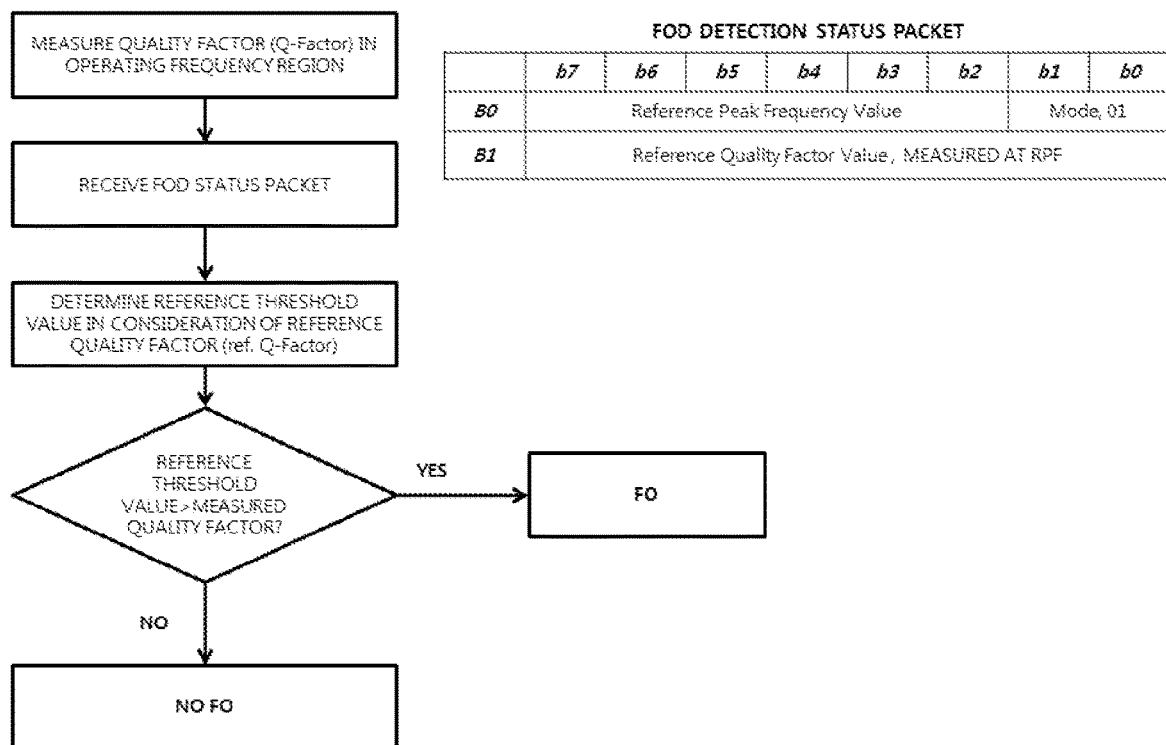

FIG. 13D is a diagram illustrating a foreign object detection procedure according to another embodiment.

Referring to FIG. 13D, a wireless power transmitter may measure the quality factor value of a resonant circuit when an object is detected in a charging area. The quality factor of the resonant circuit may mean an amplification ratio of the input/output voltage by the resonant capacitor when AC power having a specific frequency is applied to the resonant circuit. For this, refer to the description of FIGS. 11A and 11B. At this time, the quality factor value of each frequency may be measured within the operating frequency range of the wireless power transmitter.

The wireless power transmitter may store the measured quality factor value of each frequency in a predetermined memory.

The wireless power transmitter may receive a foreign object detection status packet.

Here, the foreign object detection status packet may include information on a reference peak frequency corresponding to a frequency, at which a maximum quality factor value is measured within an operating frequency, and information on a reference quality factor value corresponding to the maximum quality factor value.

The wireless power transmitter may determine the quality factor threshold value based on the reference quality factor value.

The wireless power transmitter may determine whether a foreign object is present using the quality factor threshold value and the measured quality factor value. At this time, the measured quality factor value may be a quality factor value measured at a frequency corresponding to the received reference peak frequency. Since the measured quality factor value of each frequency is stored in the memory, the wireless power transmitter may identify a frequency corresponding to the received reference peak frequency and read the measured quality factor value from the memory in correspondence with the identified frequency.

The frequency at which the quality factor value is changed most greatly depending on presence/absence of the foreign object is a reference peak frequency. Accordingly, the wireless power receiver may transmit the reference peak frequency and the quality factor value measured at the reference peak frequency to the wireless power transmitter, and the wireless power transmitter may determine whether a foreign object is present based on the received information. At this time, when the reference quality factor value corresponding to the reference peak frequency at which the quality factor value is changed most greatly depending on presence/absence of the foreign object is compared with the current quality factor value, it is possible to improve foreign object detection capability. Here, the current quality factor value corresponding to the reference peak frequency may be measured before the ping phase, without being limited thereto.

In another embodiment, the wireless power transmitter may determine whether a foreign object is present only using information on the reference peak frequency included in the foreign object detection status packet.

If the frequency corresponding to the maximum quality factor value among the quality factor values measured before the ping phase is greater than the reference peak frequency (which may be determined in consideration of a certain tolerance range), it may be determined that the foreign object is present.

Figure 14A:
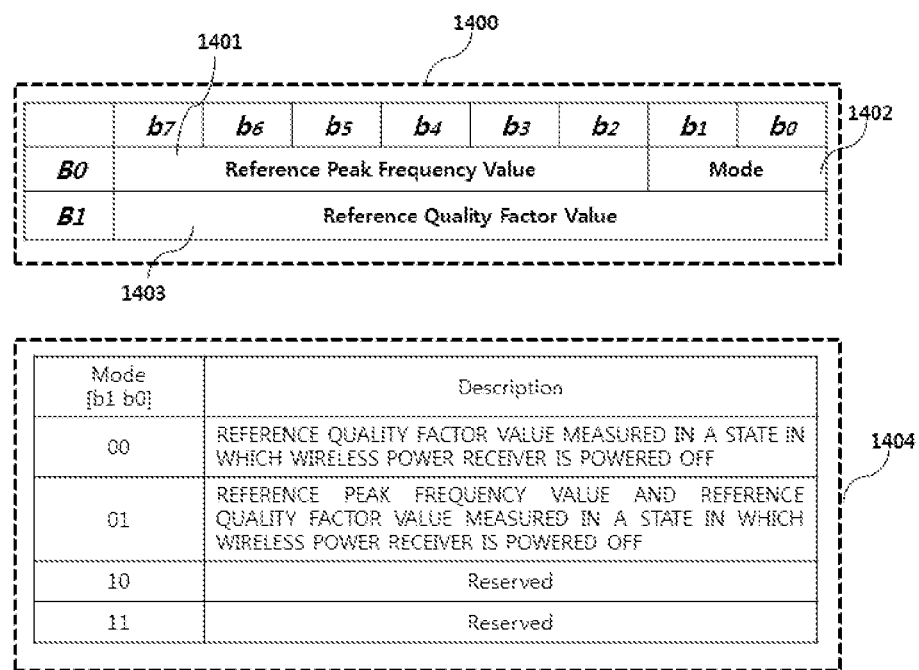
FIGS. 14A to 14B are views illustrating the structure of a foreign object detection (FOD) status packet message according to an embodiment.

FIG. 14A is a view illustrating the structure of an FOD status packet message according to an embodiment.

Referring to FIG. 14A, the FOD status packet message 1400 may have a length of 2 bytes, and include a first data 1401 field having a length of 6 bits, a mode 1402 field having a length of 2 bits and a reference quality factor value 1403 field having a length of 1 byte.

As denoted by reference numeral 1404, if the mode 1402 field is set to a binary value of "00", all bits of the first data 1401 field are recorded as 0 and information corresponding to the reference quality factor value measured and determined in a state in which the wireless power receiver is powered off is recorded in the reference quality factor value 1403 field. In contrast, if the mode 1402 field is set to a binary value of "01", information corresponding to the reference peak frequency value meaning a frequency having a maximum quality factor value within the operating frequency band in a state in which only the wireless power receiver is placed in the charging area may be recorded in the first data 1401 field. At this time, information corresponding to the reference quality factor value measured and determined in a state in which the wireless power receiver is powered on may be recorded in the reference quality factor value field 1403. The resolution of the reference peak frequency value recorded in the first data 1401 may be determined based on the size of the operating frequency band.

As shown in FIG. 14A, the first data 1401 may have a value from 0 to 63. In the case where the operating frequency band is 100 kHz to 260 kHz, when the first data 1401 is 0, this may mean that the reference peak frequency is 100 kHz, and, when the first data 1401 is 63, this may mean that the reference peak frequency is 260 kHz. At this time, the resolution of the reference peak frequency value may be set to 160 kHz/64=2.5 kHz obtained by dividing the operating frequency bandwidth by the number of first data 1410.

Alternatively, the operating frequency band for quality factor measurement may be 87 kHz to 150 kHz. At this time, any frequency value from 87 kHz to 150 kHz may be indicated in the first data 1401.

Figure 14B:
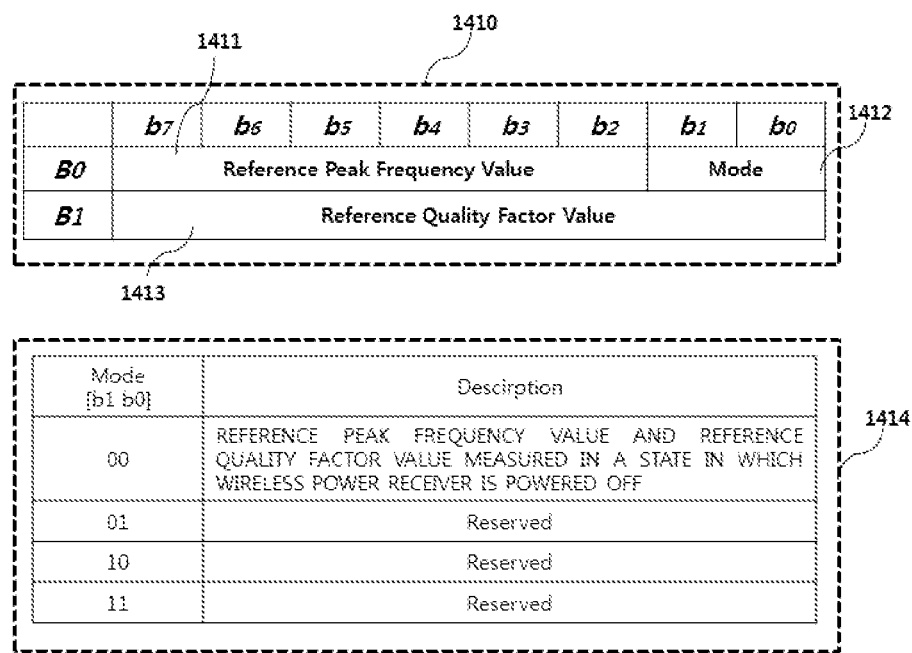

FIG. 14B is a view illustrating the structure of an FOD status packet message according to another embodiment.

Referring to FIG. 14B, the FOD status packet message 1410 may have a length of 2 bytes, and include a first data 1411 field having a length of 6 bits, a mode 1412 field having a length of 2 bits and a reference quality factor value 1413 field having a length of 1 byte.

As denoted by reference numeral 1414, if the mode 1412 field is set to a binary value of "00", information corresponding to a reference peak frequency value meaning a frequency having a maximum quality factor value within an operating frequency band in a state in which only the wireless power receiver is placed in the charging area may be recorded in the first data 1401 field. If the first data 1411 is 0, the foreign object detection apparatus may determine that the wireless power receiver does not transmit the reference peak frequency value. At this time, information corresponding to the reference quality factor value measured and determined in a state in which the wireless power receiver is powered off may be recorded in the reference quality factor value field 1413. The resolution of the reference peak frequency value recorded in the first data 1401 may be determined based on the size of the operating frequency band.

As shown in FIG. 14B, the first data 1411 may have a value from 1 to 63. In the case where the operating frequency band is 100 kHz to 260 kHz, when the first data 1411 is 1, this may mean that the reference peak frequency is 100 kHz, and, when the first data 1411 is 63, this may mean that the reference peak frequency is 260 kHz. At this time, the resolution of the reference peak frequency value may be determined to 160 kHz/63=2.54 kHz obtained by dividing the operating frequency bandwidth by the number of first data 1411.

Alternatively, the operating frequency band for quality factor measurement may be 87 kHz to 149 kHz. At this time, any frequency value from 87 kHz to 149 kHz may be indicated in the first data 1411.

In another embodiment, the foreign object detection status packets of FIGS. 14A and 14B may include information on the reference peak frequency corresponding to the frequency at which the maximum quality factor value is measured within the operating frequency and information on the reference quality factor value which is the quality factor value corresponding to the maximum quality factor value. The information on the reference peak frequency and the reference quality factor value may be stored in the memory of the wireless power receiver. This may be measured in advance using a specific wireless power transmitter in a manufacturing process. Here, the specific wireless power transmitter is a standard transmitter and is used for authentication. In actual products, the measured value of the standard transmitter may be calibrated and used in consideration of differences in design and characteristics between the actual products and the standard transmitter.

When the FOD status packet of FIG. 14 is received, the wireless power transmitter may compare the reference quality factor value with the quality factor value measured in the ping phase 520 (or before the ping phase) to determine whether a foreign object is present (Method 1) or compare the reference peak frequency with the peak frequency measured in the ping phase 520 (or before the ping phase) to determine whether a foreign object is present (Method 2, the embodiments of FIG. 11).

Alternatively, whether a foreign object is present may be determined using a complex method.

In one embodiment, the wireless power transmitter may determine whether a foreign object is present using Method 1. At this time, two threshold values (threshold value 1: Q_Threshold 1 and threshold value 2: Q_Threshold 2) may be determined based on the received reference quality factor value. Here, the threshold value 1 is greater than the threshold value 2.

When the measured quality factor value measured before the ping phase 520 is less than the threshold value 2, the wireless power transmitter may determine that a foreign object is present.

When the measured quality factor value measured before the ping phase 520 is less than the threshold value 1 and equal to or greater than the threshold value 2, the wireless power transmitter may determine whether a foreign object is present using Method 2.

Figure 15:
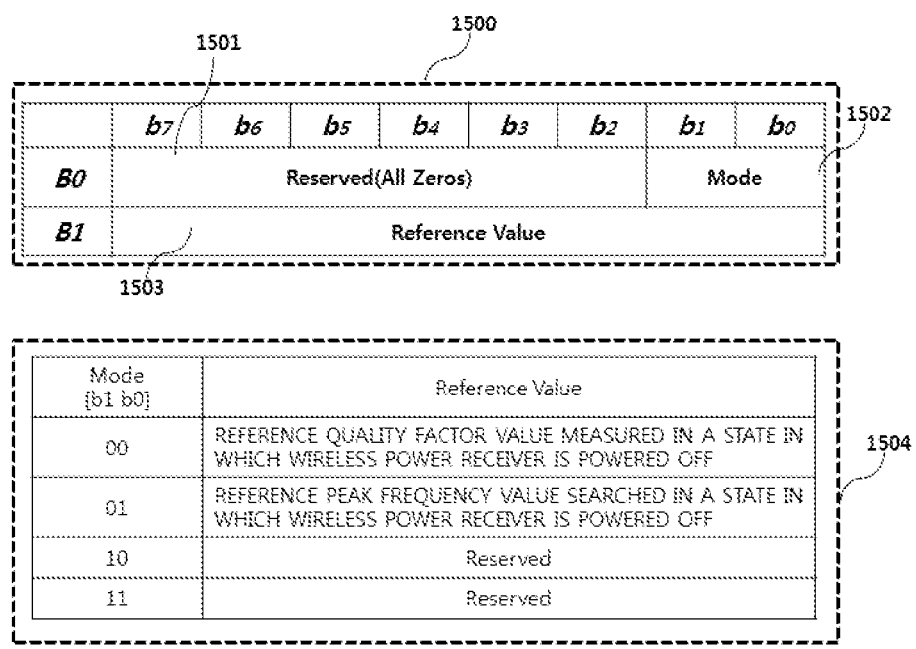
FIG. 15 is a diagram showing the structure of an FOD status packet message according to another embodiment.

FIG. 15 is a view illustrating the structure of an FOD status packet message according to another embodiment.

Referring to FIG. 15, the FOD status packet message 1500 may have a length of 2 bytes, and include a reserved 1501 field having a length of 6 bits, a mode 1502 field having a length of 2 bits and a reference value 1503 field having a length of 1 byte. Here, all bits of the reserved 1501 field are recorded as "0".

As denoted by reference numeral 1504, if the mode 1502 field is set to "00", information corresponding to a reference quality factor value measured and determined in a state in which the wireless power receiver is powered off may be recorded in the reference value 1503 field.

In contrast, if the mode 1502 field is set to a binary value of "01", information corresponding to a reference peak frequency value meaning a frequency having a maximum quality factor value within an operating frequency band in a state in which only the wireless power receiver is placed in the charging area may be recorded in the reference value 1503 field. At this time, the reference peak frequency may be searched in a state in which a foreign object is not placed but only the wireless power receiver which is powered off is present in the charging area.

In the present embodiment, the foreign object detection apparatus (or the wireless power transmission apparatus) may receive a plurality of FOD status packets in the negotiation phase to acquire the reference peak frequency value and the reference quality factor value corresponding to the wireless power receiver.

For example, if the value recorded in the reference value 1503 is a reference peak frequency, the resolution of the reference peak frequency value may be determined based on the size of the operating frequency band, that is, the operating frequency bandwidth.

If the operating frequency bandwidth of the wireless charging system is 256 kHz, the resolution of the reference peak frequency value may be 256 kHz/128=2 kHz.

As shown in FIG. 15, since the reference value 1503 field has a length of 1 byte, the reference value 1503 may have a value from 0 to 127. For example, when the wireless power transmission apparatus having an operating frequency band of 100 kHz to 356 kHz receives an FOD status packet in which the mode 1502 value is a binary value of "01" and the reference value 1503 is set to "0x05", the wireless power transmission apparatus may recognize that the reference peak frequency corresponding to the wireless power receiver is 100 kHz+5*2 kHz=110 kHz.

Figure 16:
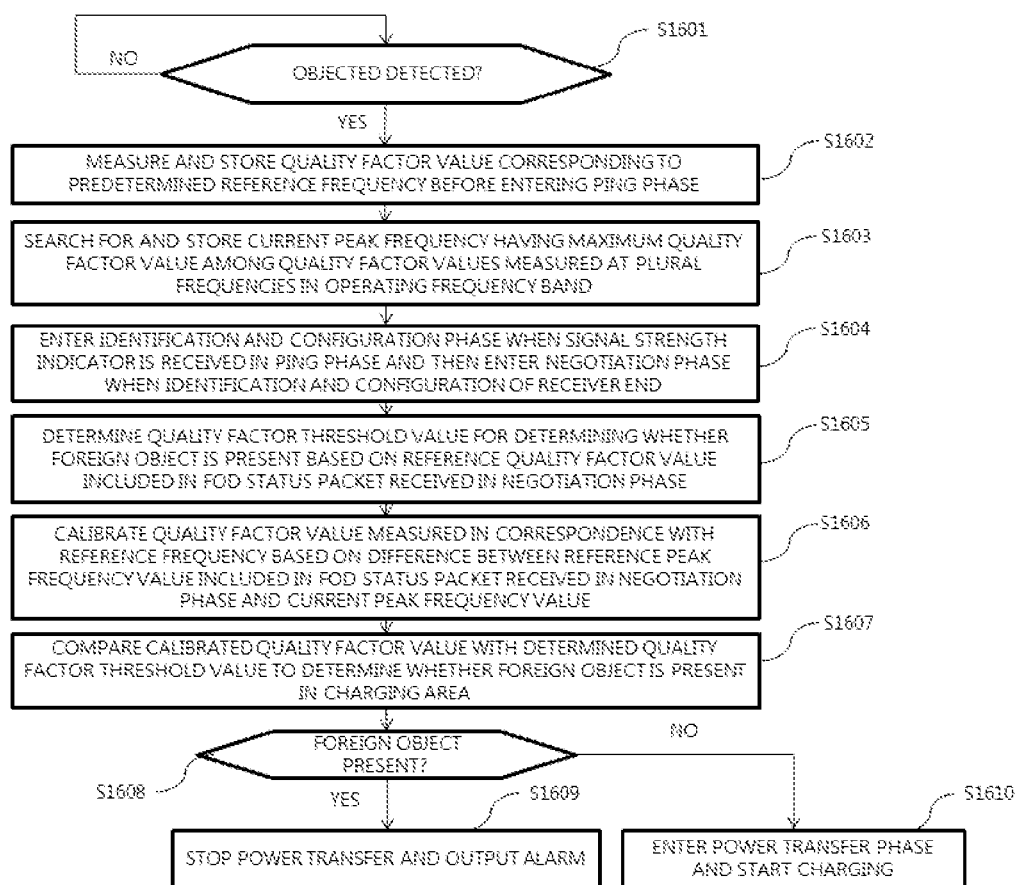
FIG. 16 is a flowchart illustrating a foreign object detection method in a wireless power transmission apparatus according to an embodiment.

FIG. 16 is a flowchart illustrating a foreign object detection method in a wireless power transmission apparatus according to an embodiment.

Referring to FIG. 16, when an object placed in the charging area is detected in the selection phase, the wireless power transmission apparatus may measure and store a quality factor value corresponding to a reference operating frequency in a predetermined recording region before entering the ping phase (S1601 to S1602). At this time, the voltage of the transmission coil is 0.5 Vrms to 2Vrms. It is possible to prevent current leakage of the rectifier of the wireless power receiver. Here, rms means root mean square.

In addition, the wireless power transmission apparatus may search for and store a current peak frequency having a maximum quality factor value among quality factor values measured at a plurality of frequencies in the operating frequency band in a predetermined recording region (S1603). Here, it should be noted that a frequency offset (or the number of frequencies) for determining frequencies at which the quality factor value is measured for searching for the current peak frequency within the operating frequency band may vary according to the design of those skilled in the art (S1603).

In the present embodiment, the operating frequency band may be 87 kHz to 150 kHz and the reference operating frequency may be 100 kHz, without being limited thereto.

When searching of the current peak frequency ends, the wireless power transmission apparatus may enter the ping phase to wirelessly transmit a digital ping signal for identifying the wireless power receiver.

When a signal strength indicator is received in response to the digital ping signal, the wireless power transmission apparatus may enter the identification and configuration phase and transition to the negotiation phase when identification and configuration of the wireless power receiver end (S1604).

The wireless power transmission apparatus may determine a threshold value (or a threshold range) for determining whether a foreign object is present based on the received FOD status packet (S1605). Here, the threshold value may be a quality factor threshold value determined based on the reference quality factor value included in the FOD status packet, without being limited thereto.

The wireless power transmission apparatus may calibrate (or compensate for) the measured quality factor value, that is, the reference measured quality factor value, in correspondence with the reference operating frequency based on a difference between the reference peak frequency value included in the FOD status packet received in the negotiation phase and the current peak frequency value (S1606).

The wireless power transmission apparatus may compare the calibrated reference measured quality factor value with the determined quality factor threshold value to determine whether a foreign object is present (S1607).

Upon determining that the foreign object is present, the wireless power transmission apparatus may perform control to stop power signal transfer and to output a predetermined warning alarm indicating that the foreign object has been detected (S1608 and S1609).

Upon determining that the foreign object is not present in step 1608, the wireless power transmission apparatus may enter the power transfer phase and start charging of the wireless power receiver (S1608 and S1610). At this time, a calibration procedure for optimizing various configuration parameters necessary for power transfer and power control may be further performed before charging of the wireless power receiver starts.

FIG. 17 is an experimental result table illustrating a reference peak frequency of each receiver type and change in peak frequency according to placement of a foreign object.

Referring to FIG. 17, the reference peak frequency 1710 acquired in a state in which only the wireless power receiver is placed in the charging area and the quality factor value 1720 measured at the reference peak frequency differ according to the receiver type.

In particular, referring to reference numerals 1710 and 1730, it can be seen that the peak frequency 1730 when the wireless power receiver and the foreign object are placed in the charging area is greater than the peak frequency 170 when only the wireless power receiver is placed.

In addition, referring to reference numerals 1720 and 1740, it can be seen that the quality factor value measured when the wireless power receiver and the foreign object are placed in the charging area is less than the quality factor value measured when only the wireless power receiver is placed.

In addition, referring to reference numeral 1750, it can be seen that the peak frequency decreases but the quality factor value increases as the position of the foreign object placed in the charging area moves away from the center.

Figure 18:
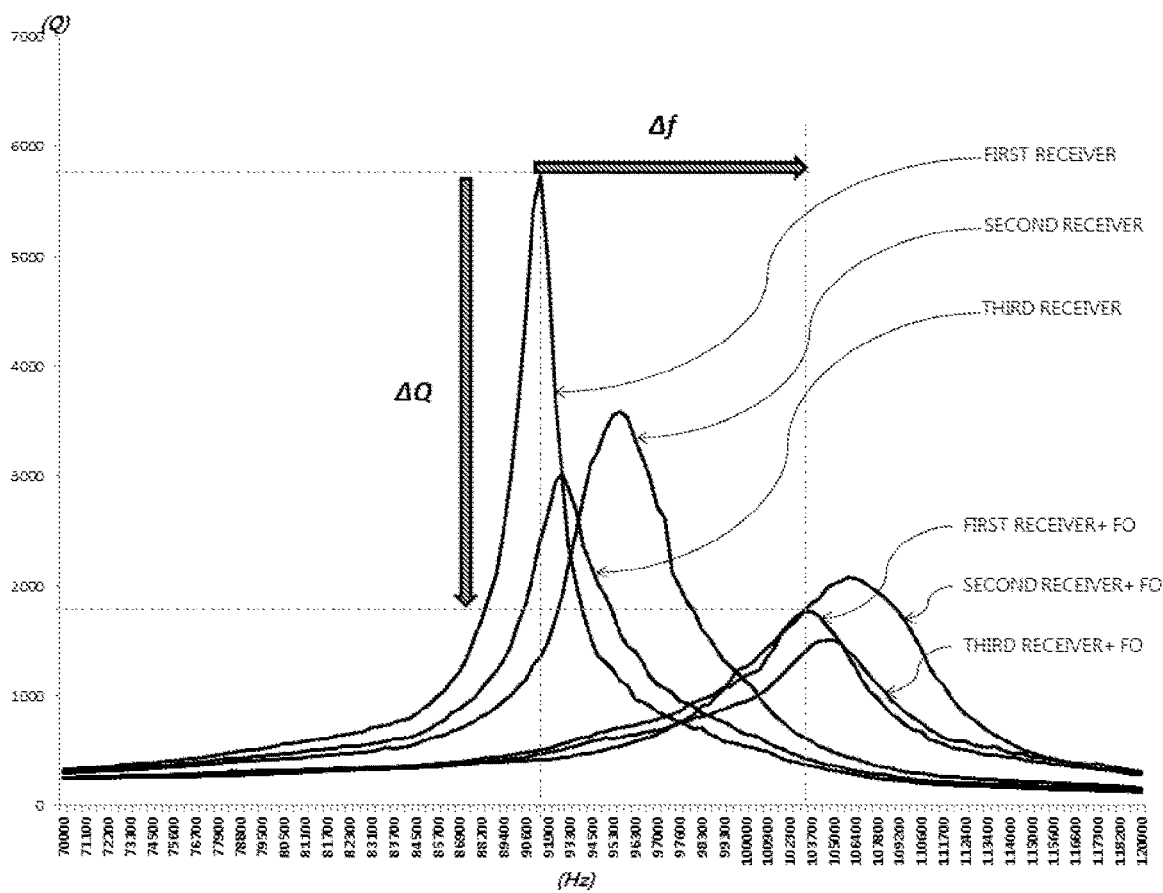
FIG. 18 is an experimental result graph showing change in quality factor value and peak frequency according to placement of a foreign object in a wireless charging system according to an embodiment.

FIG. 18 is an experimental result graph showing change in quality factor value and peak frequency according to placement of a foreign object in a wireless charging system according to an embodiment.

Referring to FIG. 18, when a first receiver and a foreign object are placed in the charging area, the peak frequency is greater than that of the case where only the first receiver is placed in the charging area by $\Delta f$. Hereinafter, for convenience of description, $\Delta f$ is referred to as a peak frequency shift value. In contrast, it can be seen that the quality factor value measured at the peak frequency corresponding to the state in which the first receiver and the foreign object are placed in the charging area, that is, the current peak frequency, is less than the quality factor value measured at the peak frequency corresponding to the state in which only the first receiver is placed, that is, the reference peak frequency, by $\Delta Q$. Hereinafter, for convenience of description, $\Delta Q$ is referred to as a quality factor shift value.

As shown in FIG. 18, results similar to the experimental result of the first receiver are obtained with respect to the remaining second to fourth receivers.

The foreign object detection apparatus according to an embodiment may calibrate the reference measured quality factor value based on the peak frequency shift value and the quality factor shift value. For example, as the sum of the peak frequency shift value and the quality factor shift value increases, the calibration ratio of the reference quality factor value may increase.

For example, the foreign object detection apparatus may receive the quality factor value (hereinafter referred to as a first maximum quality factor value, for convenience of description) corresponding to the reference peak frequency from the wireless power receiver in the negotiation phase. When the object is detected in the selection phase, the foreign object detection apparatus may measure the quality factor value at a plurality of frequencies within the operating frequency band to search for the current peak frequency. At this time, the quality factor value corresponding to the searched current peak frequency is referred to as a second maximum quality factor value. The foreign object detection apparatus may determine a value obtained by subtracting the second maximum quality factor value from the first maximum quality factor value as a quality factor shift value. In the foreign object detection status packets of FIGS. 14 to 15, a predetermined data field for additionally recording the first maximum quality factor value may be defined.

In general, in the case of a wireless charging system, a resonant phenomenon occurs at a peak frequency having a maximum quality factor value and power efficiency is maximized when the resonant phenomenon occurs.

Figure 19:
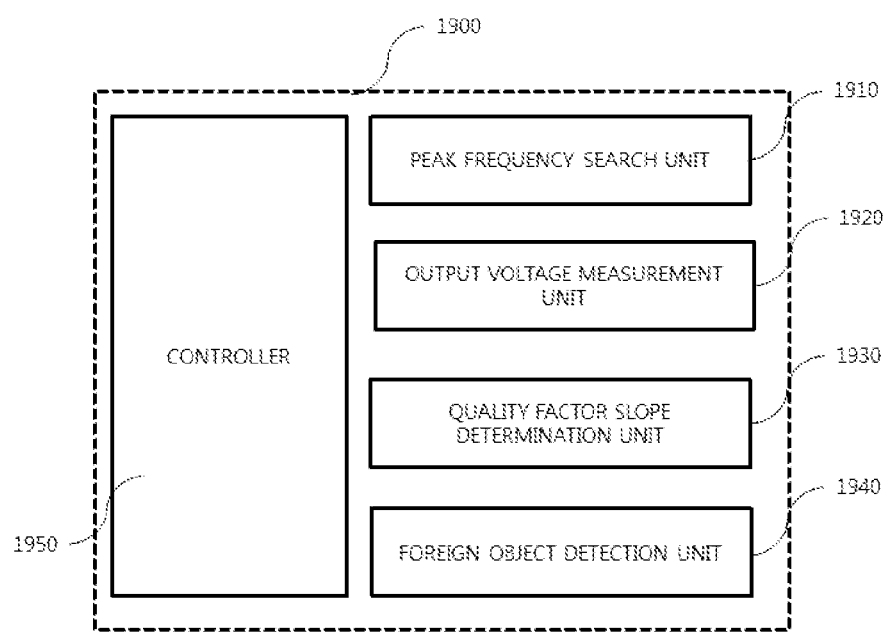
FIG. 19 is a block diagram illustrating the configuration of a foreign object detection apparatus according to another embodiment.

FIG. 19 is a block diagram illustrating the configuration of a foreign object detection apparatus according to another embodiment.

Referring to FIG. 19, the foreign object detection apparatus 1900 may include a peak frequency search unit 1910, an output voltage measurement unit 1920, a quality factor slope determination unit 1930, a foreign object detection unit 1940 and a controller 1950. The components of the foreign object detection apparatus 1900 are not necessarily mandatory and some components may be added or deleted.

Upon detecting that the object is placed in the charging area in the selection phase, the peak frequency search unit 1910 may temporarily stop power transfer and search for a frequency having a maximum quality factor value within the operating frequency band. Here, a frequency search offset for searching for the frequency having the maximum quality factor value is determined in units of 10 kHz*k (k being a natural number). However, the embodiment is not limited thereto and the frequency search offset may be defined in fewer or greater units. Hereinafter, for convenience of description, the frequency having the maximum quality factor value within the operating frequency band searched after the object is detected is referred to as a current peak frequency F_current_peak. In contrast, a frequency having a maximum quality factor value acquired through the preliminary experiment in a state in which only the wireless power receiver is placed in the charging area is referred to as a reference peak frequency F_reference_peak.

The output voltage measurement unit 1920 may measure the output voltage level at a specific frequency within the operating frequency band. For example, the frequency at which the output voltage level is measured may include at least one of the start frequency F_start of the operating frequency band, the searched current peak frequency, and the end frequency F_end of the operating frequency band. The output voltage level may be the strength of the voltage applied to the transmission coil of the resonant circuit. However, the embodiment is not limited thereto and the measurement position of the output voltage level may vary according to the design of those skilled in the art.

Figure 20:
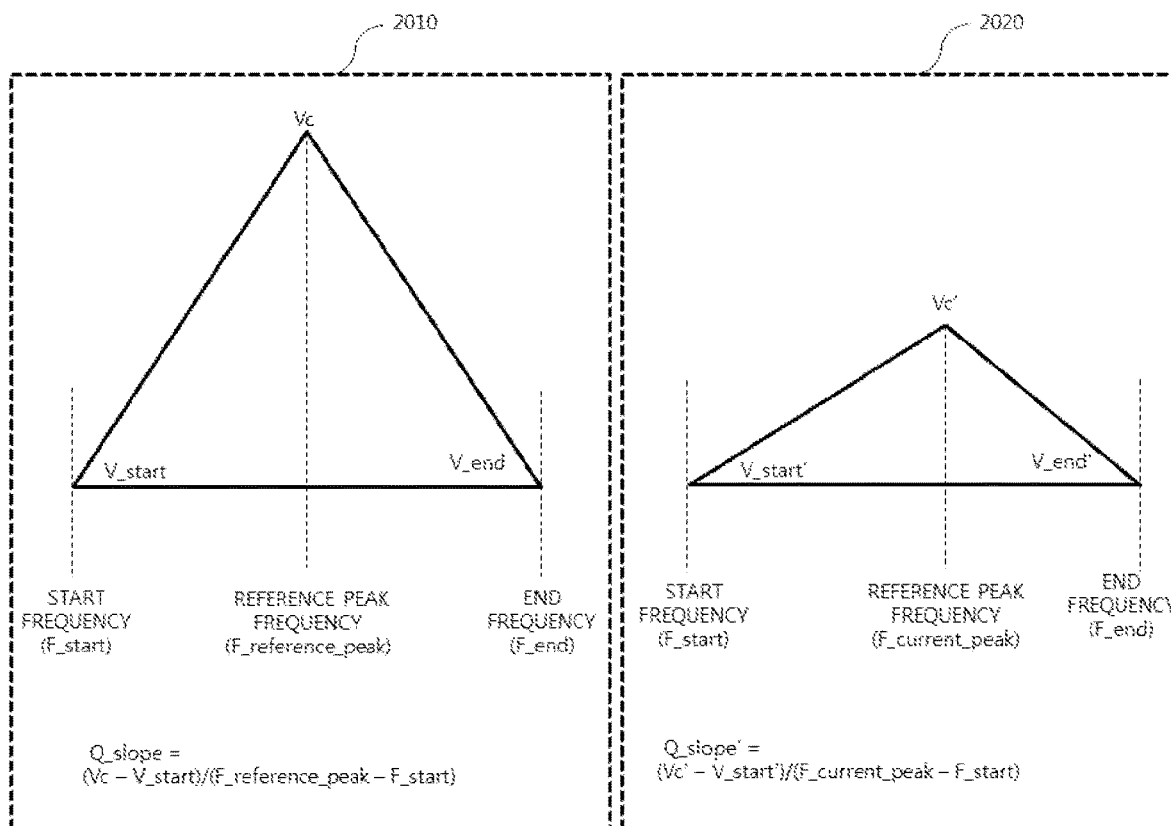
FIG. 20 is a view illustrating change in quality factor slope depending on whether a foreign object is present in a wireless charging system according to an embodiment.

The quality factor slope determination unit 1930 may calculate a quality factor slope based on the voltage value of a specific frequency measured by the output voltage measurement unit 1920. For example, the output voltage level measured at the start frequency and the output voltage level measured at the current peak frequency are referred to as V_start' and Vc', respectively. At this time, the quality factor slope Q_slope' may be calculated by the following equation:

$$(Vc'-V\_start')/(F\_current\_peak-F\_start)$$

as denoted by reference numeral 2020 of FIG. 20.

Although the quality factor slope is calculated based on the measurement voltage level in the embodiments of FIGS. 19 to 21, this is merely an embodiment. In another embodiment, the quality factor slope may be calculated based on the quality factor value measured at the corresponding frequency.

The quality factor slope Q_slope' may be calculated based on the output voltage level Vc' measured at the current peak frequency and the output voltage level V_end' measured at the end frequency according to another embodiment. In this case, the quality factor slope may be calculated by the following equation:

$$(Vc'-V\_end')/(F\_current\_peak-F\_end)$$

Hereinafter, for convenience of description, the quality factor slope calculated based on the output voltage levels (or the quality factor values) measured at the start frequency and the current peak frequency is referred to as a first quality factor slope and a quality factor slope calculated based on the output voltage levels (or the quality factor values) measured at the current peak frequency and the end frequency is referred to as a second quality factor slope.

The foreign object detection unit 1940 may compare the calculated quality factor slope with a predefined threshold value to detect a foreign object placed in the charging area.

For example, the foreign object detection unit 1940 may compare the calculated first quality factor slope with a predefined first quality factor slope threshold value to determine whether a foreign object is present. Here, the first quality factor slope threshold value may have a positive value.

In another example, the foreign object detection unit 1940 may compare the calculated second quality factor slope with a predefined second quality factor slope threshold value to determine whether a foreign object is present. Here, the second quality factor slope threshold value may have a positive value.

The first quality factor slope threshold value may be included in the foreign object detection status packet of FIG. 15 and may be received from the wireless power receiver. At this time, the first quality factor slope threshold value may be recorded in the reference value field. However, this is merely one embodiment and a new field for recording the first quality factor slope threshold value may be defined in the foreign object detection status packet.

In another example, the foreign object detection unit 1940 may calculate an average value of the first quality factor slope and the second quality factor slope and compare the calculated quality factor slope average value with a predefined quality factor slope threshold value, thereby determining whether a foreign object is present. Here, the average value may be calculated by dividing a difference between the second quality factor slope and the first quality factor slope by 2.

As shown in FIG. 20, the absolute value of the quality factor slope calculated when only the receiver is placed in the charging area is greater than that of the quality factor slope calculated when the receiver and the foreign object are placed.

Accordingly, the foreign object detection unit 1940 may determine that the foreign object is placed in the charging area, when the calculated first quality factor slope is less than the first quality factor slope threshold value.

The foreign object detection unit 1940 may determine that the foreign object is not present in the charging area, when the calculated first quality factor slope is equal to or greater than the first quality factor slope threshold value.

For example, the first quality factor slope threshold value may be predefined based on the type of the wireless power receiver and maintained in a predetermined recording region of the foreign object detection apparatus 1950.

In another example, the first quality factor slope threshold value may be the same in all wireless power receivers.

In another example, the first quality factor slope threshold value may be directly received from the wireless power receiver through a communication unit (not shown). At this time, the foreign object detection apparatus 1900 may acquire the first quality factor slope threshold value and/or the second quality factor slope threshold value through the foreign object detection (FOD) status packet received in the wireless power receiver in the negotiation phase.

The controller 1950 may control overall operation of the foreign object detection apparatus 1900, and temporarily stop power transfer to the wireless power receiver and control an alarm unit (not shown) configured to output a predetermined warning alarm indicating that the foreign object is present in the charging area, when the foreign object is detected by the foreign object detection unit 1940.

In addition, the controller 1950 may monitor whether the detected foreign object has been removed after outputting the warning alarm. If the foreign object has been removed as the monitoring result, the controller 1950 may perform control to release the warning alarm and to resume power transfer to the wireless power receiver.

FIG. 20 is a view illustrating change in quality factor slope depending on whether a foreign object is present in a wireless charging system according to an embodiment.

Referring to FIG. 20, reference numeral 2010 shows an example in which the quality factor slope is calculated in a state in which only the wireless power receiver is placed in the charging area and reference numeral 2020 shows an example in which the quality factor slope is calculated in a state in which the wireless power receiver and the foreign object are placed in the charging area. It can be seen from FIG. 20 that the quality factor slope Q_slope' calculated in the state in which the foreign object is further placed in the charging area is less than the quality factor slope Q_slope calculated in the state in which only the wireless power receiver is placed in the charging area.

Hereinafter, for convenience of description, Q_slope and Q_slope' are referred to as a reference quality factor slope and a current quality factor slope, respectively.

The quality factor slope threshold value according to an embodiment may be set to any value less than the reference quality factor slope of reference numeral 2010 and greater than the current quality factor slope of reference numeral 2020.

Figure 21A:
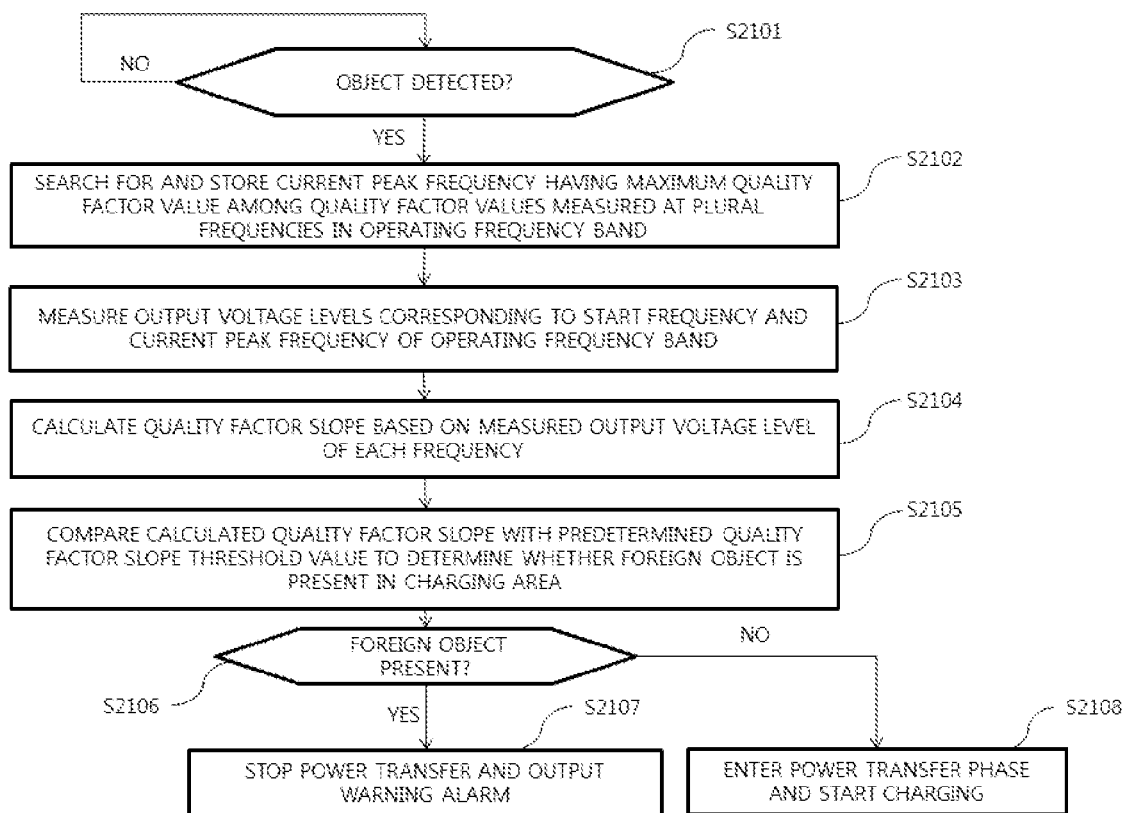
FIGS. 21A to 21B are flowcharts illustrating a foreign object detection method in a wireless power transmission apparatus according to an embodiment.

FIG. 21A is a flowchart illustrating a foreign object detection method in a wireless power transmission apparatus according to another embodiment.

Referring to FIG. 21A, the wireless power transmission apparatus may detect an object placed in the charging area in the selection phase (S2101).

When the object is detected, the wireless power transmission apparatus may temporarily stop power transfer before entering the ping phase, search for a current peak frequency having a maximum value among the quality factor values measured at a plurality of frequencies within the operating frequency band, and store the current peak frequency in a predetermined recording region (S2102).

Here, it should be noted that a frequency offset (or the number of frequencies) for determining frequencies at which the quality factor value is measured in order to search for the current peak frequency within the operating frequency band may vary according to the design of those skilled in the art. In addition, the operating frequency band may vary according to the design of the wireless charging system and the applied standard.

The wireless power transmission apparatus may measure the output voltage levels respectively corresponding to the start frequency and the end frequency of the operating frequency band (S2103).

The wireless power transmission apparatus may calculate the quality factor slope based on the output voltage levels measured at the start frequency and the current peak frequency (S2004). Here, the quality factor slope Q_slope' may be calculated by dividing a difference between the output voltage level Vc' measured at the current peak frequency F_current_peak and the output voltage level V_start' measured at the start frequency F_start by a difference between the current peak frequency and the start frequency. That is, the quality factor slope may be calculated by the following equation:

$$Q\_slope'=(Vc'-V\_start')/(F\_current\_peak-F\_start)$$

The wireless power transmission apparatus may compare the calculated quality factor slope with a predetermined quality factor slope threshold value to determine whether a foreign object is present (S2105).

Upon determining that the foreign object is present, the wireless power transmission apparatus may perform control to stop power signal transfer and to output a predetermined warning alarm indicating that the foreign object has been detected (S2106 and S2107).

Upon determining that the foreign object is not present in step 2105, the wireless power transmission apparatus may enter the power transfer phase and start charging of the wireless power receiver (S2106 and S2108).

Figure 21B:
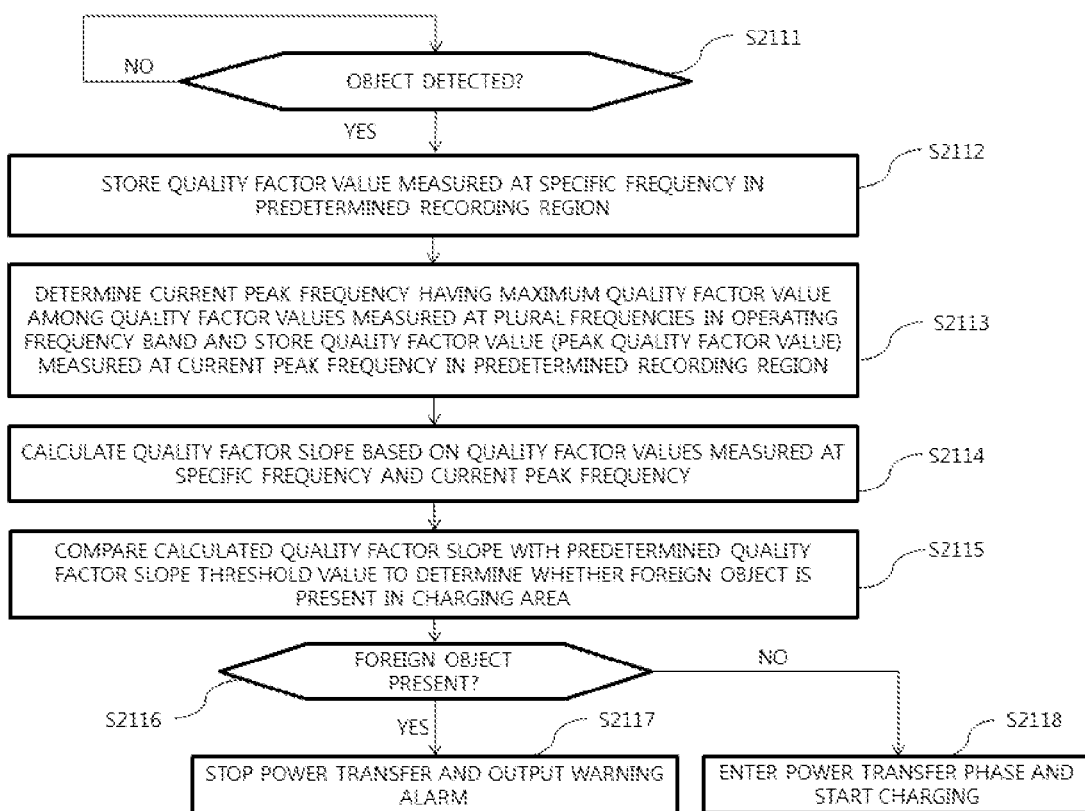

FIG. 21B is a flowchart illustrating a foreign object detection method in a wireless power transmission apparatus according to another embodiment.

Referring to FIG. 21B, the wireless power transmission apparatus may detect an object placed in the charging area in the selection phase (S2111).

When the object is detected, the wireless power transmission apparatus applies a low voltage (e.g., 0.5 to 2V) to the inverter 1120 before entering the ping phase to measure the quality factor value at a plurality of frequencies within the operating frequency band.

The controller 1180 may store the quality factor value measured at a specific frequency in a predetermined recording region (S2112). For example, the specific frequency may be a predefined frequency within the operating frequency band, and may be used interchangeably with a measurement start frequency for convenience of description. In addition, the quality factor value measured at the measurement start frequency is referred to as a start quality factor value.

The controller 1180 may determine a current peak frequency, at which a maximum value is measured, among the measured quality factor values and store the current peak frequency and the peak quality factor value measured at the corresponding frequency in a predetermined recording region (S2113).

Here, it should be noted that a frequency offset (or the number of frequencies) for determining frequencies at which the quality factor value is measured in order to search for the current peak frequency within the operating frequency band may vary according to the design of those skilled in the art. In addition, the operating frequency band may vary according to the design of the wireless charging system and the applied standard.

The wireless power transmission apparatus may calculate the quality factor slope based on the quality factor values measured at a specific frequency (start frequency) and the current peak frequency (S2114). The quality factor slope Q_slope' may be determined as follows.

$$Q\_slope'=(Qc'-Q\_start')/(F\_current\_peak-F\_start)$$

where, F_current_peak denotes a current peak frequency, F_start denotes a specific frequency (start frequency), Qc' denotes a peak quality factor value, and Q_start' denotes a start quality factor value.

The wireless power transmission apparatus may compare the calculated quality factor slope with a predetermined quality factor slope threshold value to determine whether a foreign object is present in the charging area (S2115).

In another embodiment, the predetermined quality factor slope threshold value may be determined based on the information included in the foreign object detection status packet as in the embodiment of FIG. 14.

For example, in the foreign object detection status packet, a field for transmitting information on the quality factor slope threshold value or a value of an angle unit corresponding to the quality factor slope threshold value may be defined.

Upon determining that the foreign object is present, the wireless power transmission apparatus may perform control to temporarily stop power transfer and to output a predetermined warning alarm indicating that the foreign object has been detected (S2116 and S2117).

Upon determining that the foreign object is not present in step 2115, the wireless power transmission apparatus may enter the power transfer phase and start charging of the wireless power receiver (S2116 and S2118).

Although the quality factor slope is calculated based on the output voltage levels measured at the start frequency and the current peak frequency in the embodiments of FIGS. 19 to 21A and 21B, this is merely an embodiment. In another embodiment, the quality factor slope may be calculated based on the quality factor values measured at the start frequency and the current peak frequency. It should be noted that, instead of the output voltage measurement unit 1920 shown in FIG. 19, a quality factor measurement unit (not shown) for measuring the quality factor values corresponding to the start frequency and the current peak frequency is included in the foreign object detection apparatus 1900.

The method according to the foregoing embodiments may be implemented as code that can be written to a computer-readable recording medium and can thus be read by a computer. Examples of the computer-readable recording medium include a ROM, a RAM, a CD-ROM, a magnetic tape, a floppy disk, an optical data storage, and a carrier wave (e.g., data transmission over the Internet).

The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Those skilled in the art will appreciate that the disclosure may be carried out in other specific ways than those set forth herein without departing from the spirit and essential characteristics of the disclosure.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The foreign object detection method according to the embodiment may be used in a wireless charging system for detecting a foreign object located between a wireless power transmitter and a wireless power transmitter using a quality factor value.

What is claimed is:

1. A wireless power transmitter that transmits power to a wireless power receiver, the wireless power transmitter comprising:
a wireless communication unit configured to communicate with the wireless power receiver; and
a controller,
wherein the wireless communication unit receives, from the wireless power receiver, a first foreign object status packet and a second foreign object status packet and transmits, to the wireless power receiver, a foreign object detection indicator indicating whether a foreign object is present in a charging area of the wireless power transmitter,
wherein the controller is configured to generate the foreign object detection indicator,
wherein the first foreign object status packet includes a first reference value and mode information,
wherein the second foreign object status packet includes a second reference value and mode information,
wherein the mode information of the first foreign object status packet indicates whether the first reference value is a reference quality factor or a reference peak frequency of the wireless power receiver,
wherein the mode information of the second foreign object status packet indicates whether the second reference value is the reference quality factor or the reference peak frequency of the wireless power receiver, and
wherein when the foreign object detection indicator indicates that the foreign object is not present in the charging area, the controller is configured to perform a wireless charging procedure.

2. The wireless power transmitter of claim 1, wherein when the foreign object detection indicator indicates that the foreign object is present in the charging area, the controller is configured to stop the wireless charging procedure.

3. The wireless power transmitter of claim 1, wherein the wireless communication unit first receives the first foreign object status packet and then receives the second foreign object status packet or first receives the second foreign object status packet and then receives the first foreign object status packet.

4. The wireless power transmitter of claim 1, wherein the wireless communication unit receives a response signal to the foreign object detection indicator from the wireless power receiver.

5. The wireless power transmitter of claim 1, wherein the foreign object detection indicator is generated based on the first foreign object status packet and the second foreign object status packet.

6. The wireless power transmitter of claim 1, wherein when one of a measurement quality factor and a measurement peak frequency of a power signal transmitted from the wireless power transmitter is greater than a first threshold value, the foreign object detection indicator indicates that the foreign object is present in the charging area, and
wherein when the other one of the measurement quality factor and the measurement peak frequency of the power signal transmitted from the wireless power transmitter is smaller than or equal to a second threshold value, the foreign object detection indicator indicates that the foreign object is not present in the charging area.

7. The wireless power transmitter of claim 6, wherein at least one of the first threshold value and the second threshold value is generated based on at least one of the first reference value and the second reference value.

8. The wireless power transmitter of claim 1, wherein when the foreign object is present in the charging area, a peak frequency of the power signal transmitted from the wireless power transmitter is shifted from the reference peak frequency.

9. The wireless power transmitter of claim 1, wherein the foreign object detection indicator includes a first foreign object detection indicator generated based on the first foreign object status packet and a second foreign object detection indicator generated based on the second foreign object status packet.

10. The wireless power transmitter of claim 9, wherein the first foreign object detection indicator is determined using a measurement quality factor value of the power signal transmitted from the wireless power transmitter and the first reference value, and
wherein the second foreign object detection indicator is determined using a measurement peak frequency value of the power signal transmitted from the wireless power transmitter and the second reference value.

* * * * *